(12) United States Patent
Sun et al.

(10) Patent No.: US 11,050,689 B2
(45) Date of Patent: Jun. 29, 2021

(54) METHOD AND APPARATUS FOR CENTRALIZED MANAGEMENT OF PERSONNEL AND EQUIPMENT BASED ON INSTANT MESSAGING APPLICATION

(71) Applicant: Alibaba Group Holding Limited, Grand Cayman (KY)

(72) Inventors: Jiankang Sun, Zhejiang (CN); Bijun Zhu, Zhejiang (CN); Hao Yang, Zhejiang (CN); Qing Ren, Zhejiang (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/265,696

(22) Filed: Feb. 1, 2019

(65) Prior Publication Data

US 2019/0166075 A1    May 30, 2019

Related U.S. Application Data

(63) Continuation of application No. PCT/CN2017/093767, filed on Jul. 21, 2017.

(30) Foreign Application Priority Data

Aug. 3, 2016  (CN) .......................... 201610630260.6

(51) Int. Cl.
*G06F 15/16* (2006.01)
*H04L 12/58* (2006.01)
(Continued)

(52) U.S. Cl.
CPC ......... *H04L 51/04* (2013.01); *G06Q 10/0631* (2013.01); *G06Q 50/10* (2013.01);
(Continued)

(58) Field of Classification Search
CPC ..... H04L 51/04; H04L 51/046; H04L 67/303; H04L 67/36; H04L 67/24; H04L 65/4015;
(Continued)

(56) References Cited

U.S. PATENT DOCUMENTS 6,944,555 B2    9/2005    Blackett et al.
6,990,591 B1    1/2006    Pearson
(Continued)

FOREIGN PATENT DOCUMENTS

CN    205007207 A    10/2015
CN    105049306 A    11/2015
(Continued)

OTHER PUBLICATIONS

Translation of Chinese Office Action dated Mar. 20, 2019, from corresponding CN Patent Application No. 201610630260.6, 12 pages.
(Continued)

*Primary Examiner* — Richard G Keehn
(74) *Attorney, Agent, or Firm* — Lee & Hayes, P.C.

(57) ABSTRACT

The present application provides a method and apparatus for centralized management of personnel and equipment based on an instant messaging application. The method may include determining a device bound to a preset community; adding information of the device to an organizational architecture of the preset community, so that when a community member of the preset community views an organizational architecture in the instant messaging application, the information of the device is presented in the organizational architecture. Through the technical solution of the present application, the information of the device may be added and presented in the organizational architecture of the community, so as to uniformly manage the members and the devices in the community.

20 Claims, 21 Drawing Sheets

(51) Int. Cl.
    *H04L 29/08*     (2006.01)
    *H04L 29/06*     (2006.01)
    *G06Q 50/10*     (2012.01)
    *G06Q 10/06*     (2012.01)
    *H04L 12/18*     (2006.01)
    *G06Q 50/30*     (2012.01)

(52) U.S. Cl.
    CPC ............ *G06Q 50/30* (2013.01); *H04L 12/185* (2013.01); *H04L 51/046* (2013.01); *H04L 65/403* (2013.01); *H04L 65/4015* (2013.01); *H04L 67/24* (2013.01); *H04L 67/303* (2013.01); *H04L 67/36* (2013.01)

(58) Field of Classification Search
    CPC . H04L 65/403; H04L 12/185; G06Q 10/0631; G06Q 50/10; G06Q 50/30
    See application file for complete search history.

(56) References Cited

U.S. PATENT DOCUMENTS

| | | | |
|---|---|---|---|
| 7,298,833 B2 | 11/2007 | Klein et al. | |
| 7,421,491 B2 | 9/2008 | Tameda et al. | |
| 8,380,889 B2 | 2/2013 | Sretenovic | |
| 8,489,715 B2 * | 7/2013 | Averbuch | H04L 12/4625 |
| | | | 709/220 |
| 9,569,587 B2 | 2/2017 | Ansari et al. | |
| 10,009,480 B2 | 6/2018 | Baker et al. | |
| 10,116,583 B2 | 10/2018 | Reagan et al. | |
| 2002/0111698 A1 | 8/2002 | Graziano et al. | |
| 2003/0054810 A1 | 3/2003 | Chen et al. | |
| 2006/0009243 A1 | 1/2006 | Dahan et al. | |
| 2006/0056397 A1 * | 3/2006 | Aizu | H04L 12/66 |
| | | | 370/352 |
| 2010/0250735 A1 | 9/2010 | Andersen | |
| 2016/0328556 A1 * | 11/2016 | Gardner | H04L 63/02 |
| 2017/0324684 A1 * | 11/2017 | Dharmapalan | G06Q 10/107 |
| 2018/0139070 A1 * | 5/2018 | Lin | H04L 12/2807 |

FOREIGN PATENT DOCUMENTS

| | | | |
|---|---|---|---|
| CN | 205121192 U | 3/2016 | |
| CN | 105739447 A | 7/2016 | |
| WO | WO2003036498 A1 | 5/2003 | |
| WO | WO-2017030433 A1 * | 2/2017 | ........... H04L 51/046 |

OTHER PUBLICATIONS

Translation of Chinese Search Report dated Mar. 20, 2019, from corresponding CN Patent Application No. 201610630260.6, 2 pages.
Translation of Search Report dated Sep. 28, 2017, from corresponding PCT Application No. PCT/CN2017/093767, 2 pages.
Translation of Written Opinion dated Sep. 28, 2017, from corresponding PCT Application No. PCT/CN2017/093767, 4 pages.
English translated Second Chinese Office Action dated Sep. 23, 2019 for Chinese Patent Application No. 201610630260.6, a counterpart foreign application of U.S. Appl. No. 16/265,696, 21 pages.

\* cited by examiner

METHOD AND APPARATUS FOR CENTRALIZED MANAGEMENT OF PERSONNEL AND EQUIPMENT BASED ON INSTANT MESSAGING APPLICATION

CROSS REFERENCE TO RELATED PATENT APPLICATIONS

The present application claims priority to and is a continuation of PCT Patent Application No. PCT/CN2017/093767, filed on Jul. 21, 2017, which is related to and claims priority to Chinese Patent Application No. 201610630260.6, entitled "Method and Apparatus for Centralized Management of Personnel and Equipment Based on Instant Messaging Applications", filed on Aug. 3, 2016, the entire contents of which are incorporated herein by reference.

TECHNICAL FIELD

The present application relates to the field of communication technology, and in particular, to a method and apparatus for centralized management of personnel and equipment based on instant messaging applications.

BACKGROUND

In the conventional techniques, the community communication application facilitates communication between members in the community by creating a group corresponding to the community. At the same time, the community communication application also applies the organizational architecture within the community to the corresponding group, so that the above group may be efficiently managed through the organizational architecture.

SUMMARY

This Summary is provided to introduce a selection of concepts in a simplified form that are further described below in the Detailed Description. This Summary is not intended to identify all features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above, the present application provides a method and apparatus for centralized management of personnel and equipment based on an instant messaging application, which may add and present information of the smart device in an organizational architecture of a community, so as to facilitate the unified management of members and smart devices in the community.

To achieve the above objective, the present application provides the following technical solutions.

According to a first aspect of the present application, a method for centralized management of personnel and equipment based on an instant messaging application is proposed. The method comprises:

determining a smart device that is bound to a preset community;

adding information of the smart device to an organizational architecture of the preset community, so that when a community member of the preset community views an organizational architecture page in the instant messaging application, the information of the smart device is presented in the organizational architecture page.

According to a second aspect of the present application, a method for centralized management of personnel and equipment based on an instant messaging application is proposed. The method comprises:

obtaining an organizational architecture of a preset community, wherein the organizational architecture corresponds to a community member of the preset community and a smart device associated with the preset community;

showing an organizational architecture page in the instant messaging application to present information of the community member or the smart device under the preset community.

According to the third aspect of the present application, an apparatus for centralized management of personnel and equipment based on an instant messaging application is proposed. The apparatus comprises:

a determining unit configured to determine a smart device that is bound to a preset community;

an adding unit configured to add information of the smart device to an organizational architecture of the preset community so that when a community member of the preset community views an organizational architecture page in the instant messaging application, the information of the smart device is presented in the organizational architecture page.

According to a fourth aspect of the present application, an apparatus for centralized management of personnel and equipment based on an instant messaging application is proposed. The apparatus comprises:

an obtaining a unit configured to obtain an organizational architecture of a preset community, wherein the organizational architecture corresponds to a community member of the preset community and a smart device associated with the preset community;

a presentation unit configured to show an organizational architecture page in the instant messaging application to present information of the community member or the smart device under the preset community.

According to a fifth aspect of the present application, a method for centralized management of personnel and equipment based on an instant messaging application is proposed. The method comprises:

showing an instant messaging session window to a preset user, wherein a target communication party of the instant messaging session window includes a preset smart device, and the preset smart device is associated with a preset community to which the preset user belongs and is added to an organizational architecture of the preset community;

obtaining a predetermined instant messaging message input by the preset user in the instant messaging session window;

sending the predetermined instant messaging message to make the preset smart device achieve a corresponding preset function.

According to a sixth aspect of the present application, an apparatus for centralized management of personnel and equipment based on an instant messaging application is proposed. The apparatus comprises:

a presentation unit configured to show an instant messaging session window to the preset user, wherein a target communication party of the instant messaging session window includes a preset smart device, and the preset smart device is associated with the preset community to which the preset user belongs and is added to an organizational architecture of the preset community;

an obtaining unit configured to obtain a predetermined instant messaging message input by the preset user in the instant messaging session window;

a sending unit configured to send the predetermined instant messaging message to make the preset smart device achieve a corresponding preset function.

As shown in the above technical solution, the present application obtains the binding relationship between the smart device and the community to add the bound smart device to the organizational architecture of the corresponding community, so that the community member can view the information of the related smart device through the organizational architecture, so as to quickly view and operate smart devices that are bound to the community, enabling efficient management of smart devices within the community.

BRIEF DESCRIPTION OF THE DRAWINGS

In order to illustrate the example embodiments of the present disclosure more clearly, the drawings used in the description of the example embodiments will be briefly introduced below. Apparently, the drawings in the following description represent some of the example embodiments of the present disclosure, and other drawings may be obtained from these drawings by those skilled in the art without any creative work.

DETAILED DESCRIPTION

Figure 1:
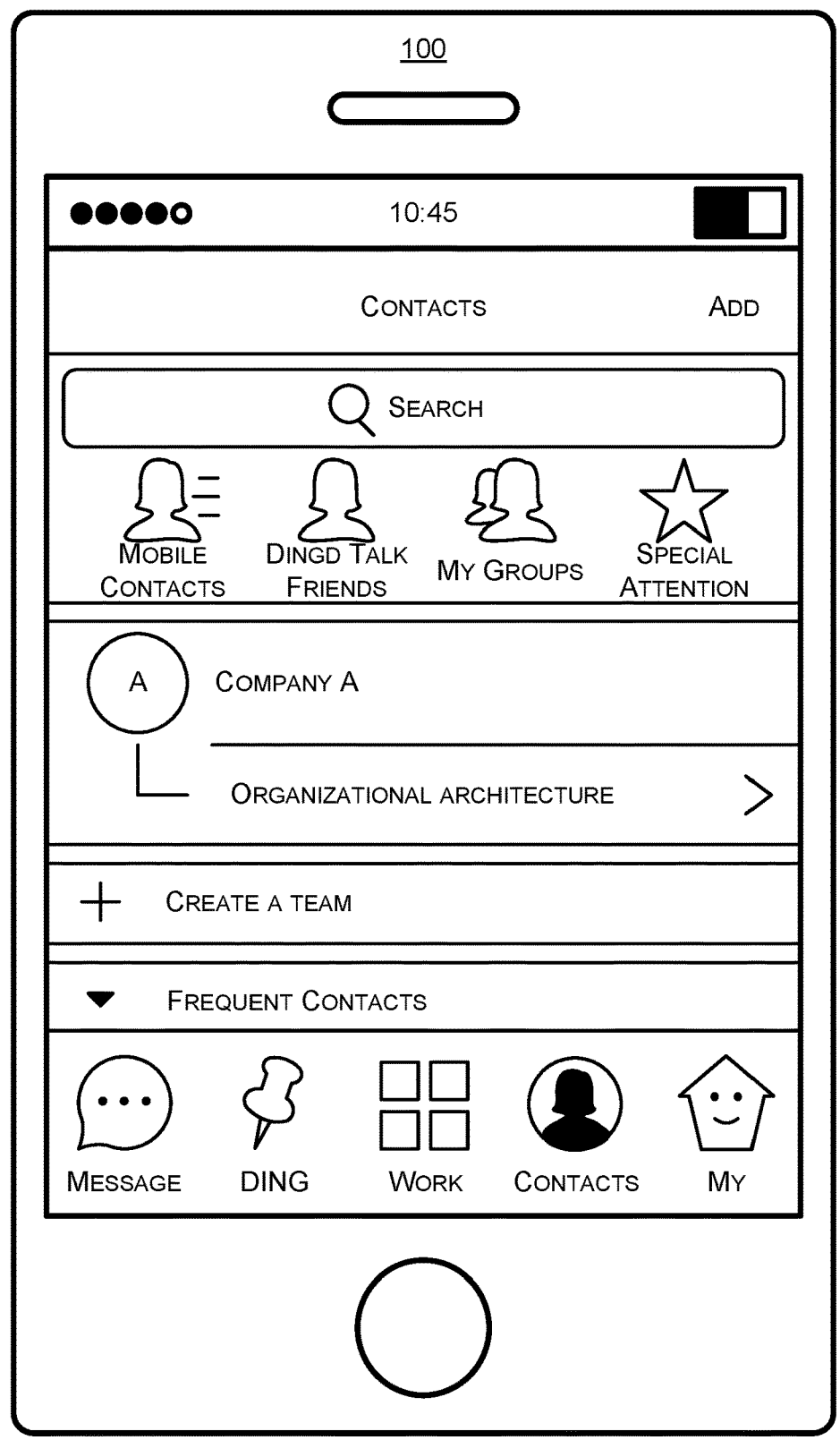
FIG. 1 is a schematic diagram of an interface of an organizational architecture in the conventional techniques.

In the conventional techniques, the community communication application may create a corresponding group for the community and add community members as members of the group. The organizational architecture of the group is applied to the group, so as to facilitate the management of the community members and the communication between the community members. FIG. 1 is a schematic diagram of an interface 100 of an organizational architecture in the conventional techniques. Take Enterprise Instant Messaging (EIM) "DING Talk" as an example, as shown in FIG. 1, when a user is an employee of Company A, the user and other employees of Company A are added as members of the corresponding group of Company A in "DING Talk", and the user can view the "organizational architecture" portal corresponding to Company A in the contact page shown in FIG. 1.

Figure 2:
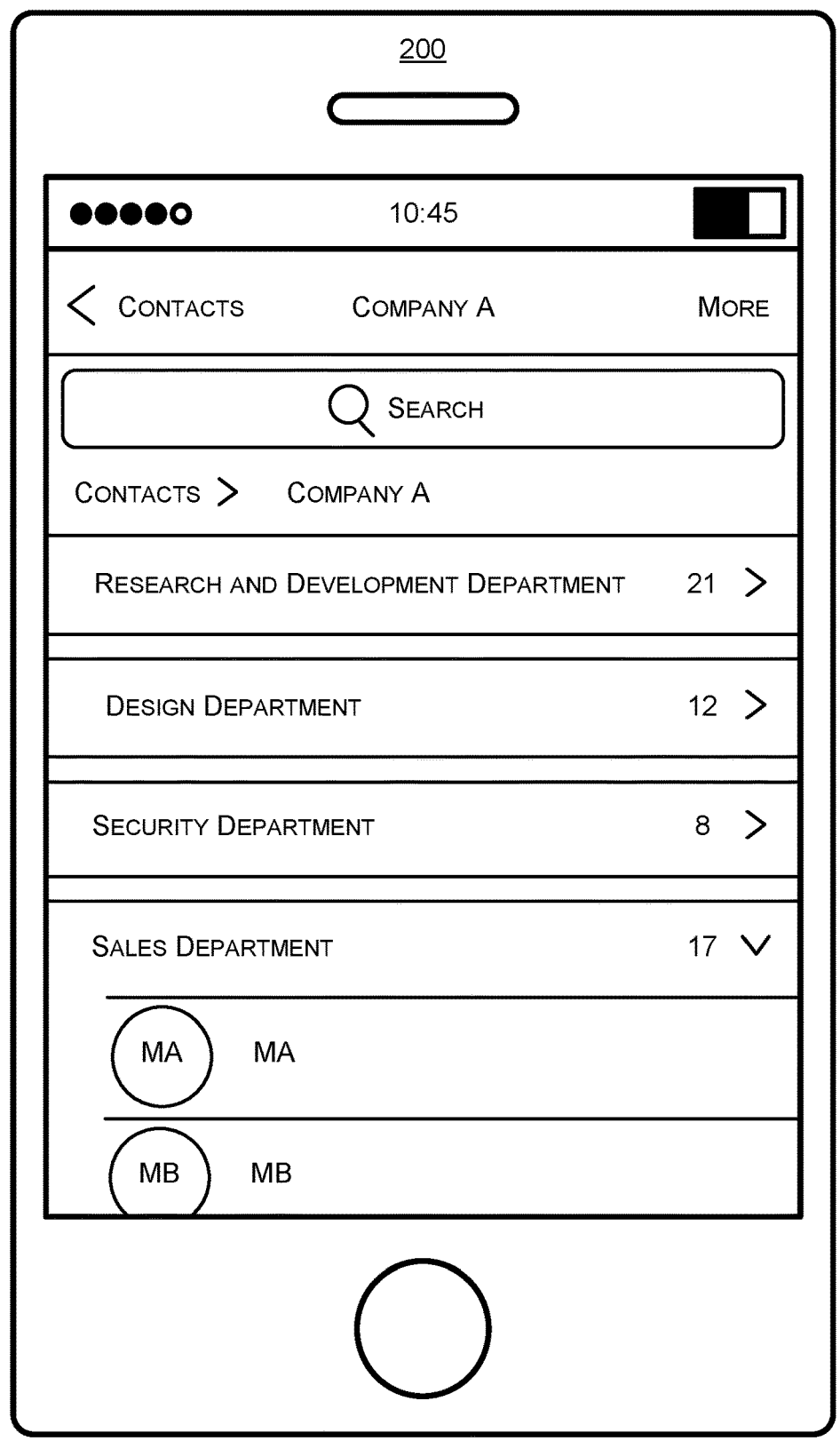
FIG. 2 is another schematic diagram of an interface of an organizational architecture in the conventional techniques.

FIG. 2 is another schematic diagram of an interface 200 of an organizational architecture in the conventional techniques. By triggering the "organizational architecture" portal, the organizational architecture page shown in FIG. 2 may be shown. When Company A includes member management levels (corresponding to departments, business groups, and so on), such as "research and development department", "design department", "security department", "sales department", and so on, the organizational architecture page includes portals respectively corresponding to the above-mentioned member management levels, i.e., functional options shown in FIG. 2 as "research and development department", "design department", "security department" and "sales department", for managing employees in the corresponding departments. Then, assuming that the portal (i.e., option) corresponding to the "sales department" of the member management level is triggered, the user can view the employees, such as "MA", "MB" and so on shown in FIG. 2, which belong to the "sales department" of the member management level in order to initiate a communication event.

However, in the community communication application in the conventional techniques, the organizational architecture of the community only includes community members, that is, the management is only performed on "person". Actually, the community may have various smart devices such as smart attendance machines and smart routers, and these smart devices often need to be set up in different locations to be able to play their roles and effects, so that when managing these smart devices, the community members need to travel long distances to each smart device, which is very time-consuming, laborious and inconvenient for the coordinated management of these smart devices.

Therefore, the present application may solve the above problems in the conventional techniques by proposing a new equipment management solution. In order to further illustrate this application, the following examples are provided.

Figure 3:
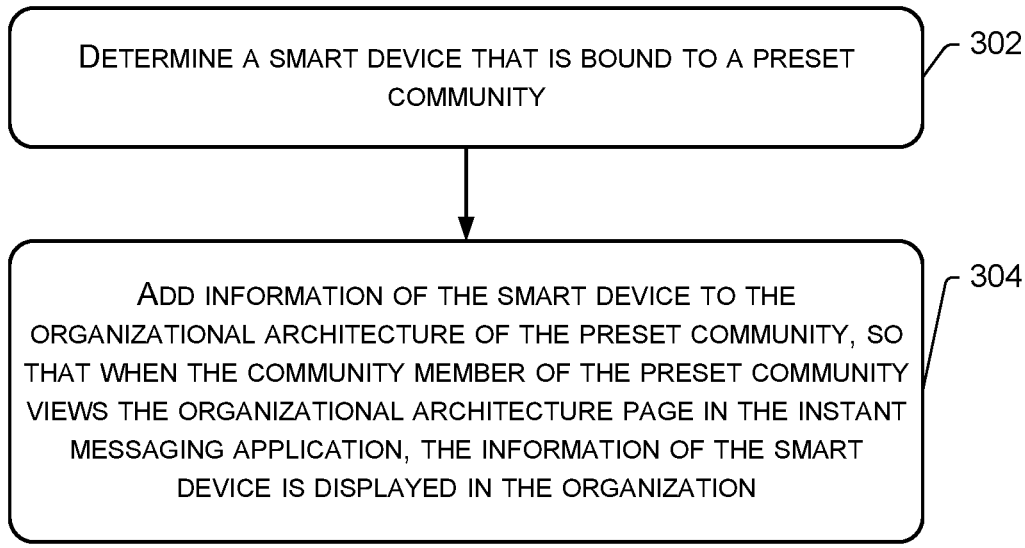
FIG. 3 is a flowchart of a method for centralized management of personnel and equipment based on an instant messaging application based on a server side according to an example embodiment of the present application.

FIG. 3 is a flowchart of a method 300 for centralized management of personnel and equipment based on an instant messaging application based on a server side according to an example embodiment of the present application. As shown in FIG. 3, the method is applied to a server and may include the following steps.

Step 302, a smart device that is bound to a preset community is determined.

In this example embodiment, the server may bind or unbind any smart device with the preset community when receiving a binding management request of a management user of the preset community for any smart device.

In this example embodiment, the management user may be an administrative staff whose management level is higher than a preset level, or an administrator, a sub-administrator, a group owner of the group corresponding to the preset community, or the like.

In this example embodiment, the smart device may be a public device, such as a smart attendance machine, a smart router, a smart printer, etc., that belongs to the preset community. These smart devices may establish a remote connection with a server of the community communication application, thereby enabling the community member (such as the above-mentioned administrative staff or an ordinary employee) to manage these smart devices through the community communication application, such as using these smart devices or configuring them, without having to walk to the assembly location of these smart devices. This helps improve the management efficiency of smart devices.

Step 304, information of the smart device is added to the organizational architecture of the preset community, so that when the community member of the preset community views the organizational architecture page, the information of the smart device is displayed in the organization.

In this example embodiment, the server may add an equipment management level in the organizational architecture and associate the information of the smart device with the equipment management level; wherein the organizational architecture further includes several member management levels corresponding to the community members, and the information of the community members of the preset community is associated with the corresponding member management level.

Further, the equipment management level may further include several sub-levels, and each sub-level corresponds to the same type of smart devices, thereby managing the same type of smart devices uniformly and managing different types of smart devices in groups. For example, when a community is associated with two smart attendance machines and one smart printer, sub-levels corresponding to the "smart attendance machines" and the "smart printer" may be created separately, wherein the "smart attendance machine" sub-level is used to manage two smart attendance machines and the "smart printer" sub-level is used to manage one smart printer.

Figure 4:
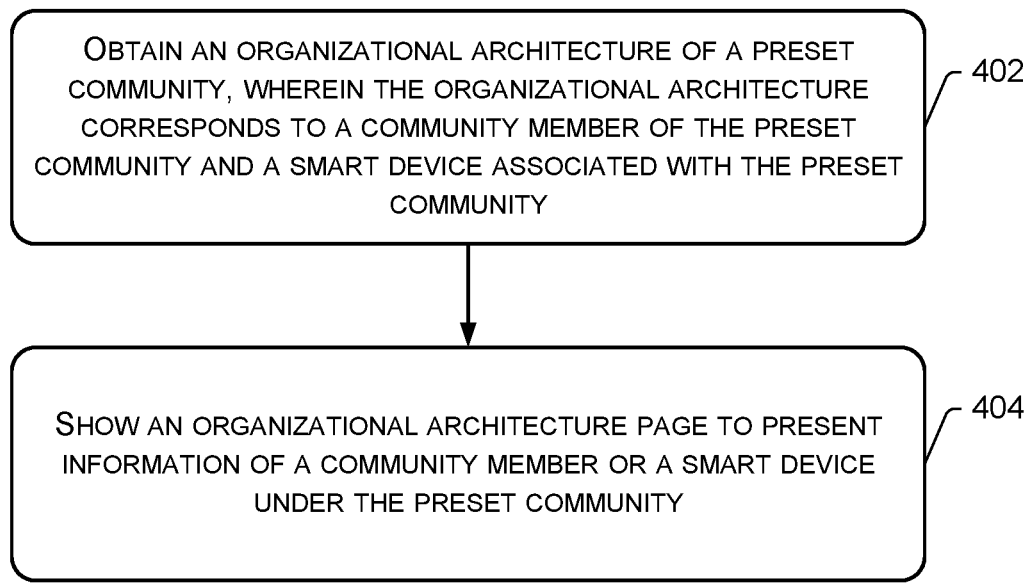
FIG. 4 is a flowchart of a method for centralized management of personnel and equipment based on an instant messaging application based on a terminal side according to an example embodiment of the present application.

Correspondingly, FIG. 4 is a flowchart of a method 400 for centralized management of personnel and equipment based on an instant messaging application based on a terminal side according to an example embodiment of the present application. As shown in FIG. 4, the method is applied to an electronic device which serves as a terminal and may include the following steps.

Step 402, an organizational architecture of a preset community is obtained, wherein the organizational architecture corresponds to a community member of the preset community and a smart device associated with the preset community.

Step 404, an organizational architecture page is shown to present information of a community member or a smart device under the preset community.

In this example embodiment, the community member may be classified into a corresponding member management level in the organizational architecture, and the smart device is classified into a corresponding equipment management level in the organizational architecture. Then, the terminal may show the organizational architecture page, and the organizational architecture page includes a member management level portal corresponding to the member management level and an equipment management level portal corresponding to the equipment management level.

The terminal may present information of the community member under the corresponding member management level when a trigger operation for any member management level portal is detected. The terminal may present information of the smart device under the corresponding equipment management level when a trigger operation for any equipment management level portal is detected. As may be seen, by binding the smart device to the community and adding the equipment management level to the organizational architecture, the community member can directly view the smart device bound to the community on the terminal so as to manage these smart devices.

Further, the terminal may further obtain an operating state of the smart device, for example, the operating state may be reported to the server by the smart device and in turn notified to the terminal by the server. Then, the terminal may indicate the operating state of the smart device in the organizational architecture page such that the community member can quickly know the operating state of the smart device through the terminal without having to walk to the smart device to check, which helps improve the management efficiency of the smart device.

Further, when it is detected that the information of any one of the smart devices is triggered, the terminal may switch to a detail page of said one smart device, wherein the detail page includes function buttons for said one smart device. When any function button is triggered, the terminal may perform corresponding control functions for said one smart device, so that the community member may remotely control the smart device through the terminal, for example, the community member may remotely enable, disable, or otherwise control the smart device.

Figure 5:
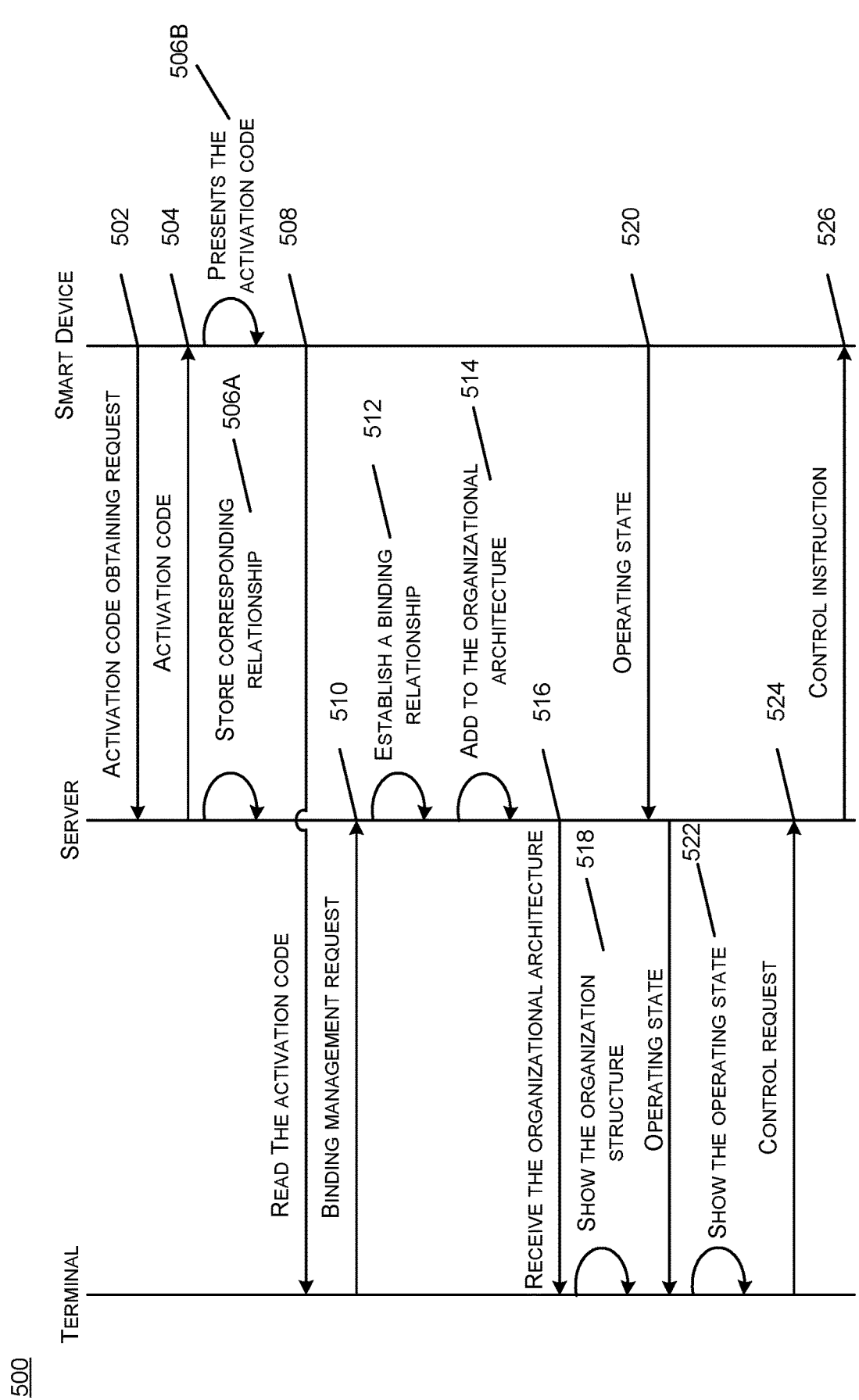
FIG. 5 is a flowchart of a method for centralized management of personnel and equipment based on an instant messaging application according to an example embodiment of the present application.

For ease of understanding, the scheme of the centralized management of personnel and equipment based on an instant messaging application according to the present application is described in detail below with reference to an interactive process among the terminal, the server, and the smart device in combination with reference to FIG. 5, wherein FIG. 5 is a flowchart of an equipment management method 500 provided by an example embodiment of the present application. As shown in FIG. 5, the method 500 may include the following steps.

Step 502, the smart device sends an activation code obtaining request to the server.

Step 504, the server assigns an activation code to the smart device.

In this example embodiment, after the smart device is powered on, whether there is an activation code in the storage space may be checked. If yes, the method may directly go to step 506B, otherwise, an activation code obtaining request may be sent to the server, so that the server assigns a uniquely corresponding activation code to the smart device. Since the activation code uniquely corresponds to the smart device, the activation code may be used as identification information of the smart device.

In this example embodiment, after the smart device receives the activation code assigned by the server, the activation code may be saved to the storage space, and the activation code is always applied thereafter. Alternatively, the smart device may actively age the obtained activation code according to a preset period and request a new activation code from the server such that the server may use the new activation code to replace the old activation code (i.e., the aged activation code), for example, to update the following corresponding relationship between the activation code and the smart device.

Step 506A, the server stores a corresponding relationship between the smart device and the activation code.

In this example embodiment, in the activation code obtaining request sent by the smart device, the MAC address of the smart device or the like may be included as the ID information of the smart device, so that the server may establish a corresponding relationship between the ID information and the assigned activation code.

In the case that the activation code does not need to be updated, the activation code may be written into the smart device in advance, and the corresponding relationship between the activation code and the smart device may be stored in the server, so that the smart device may directly read and use the activation code without requesting the server to obtain an activation code through the above steps.

Step 506B, the attendance device presents the activation code.

Figure 6:
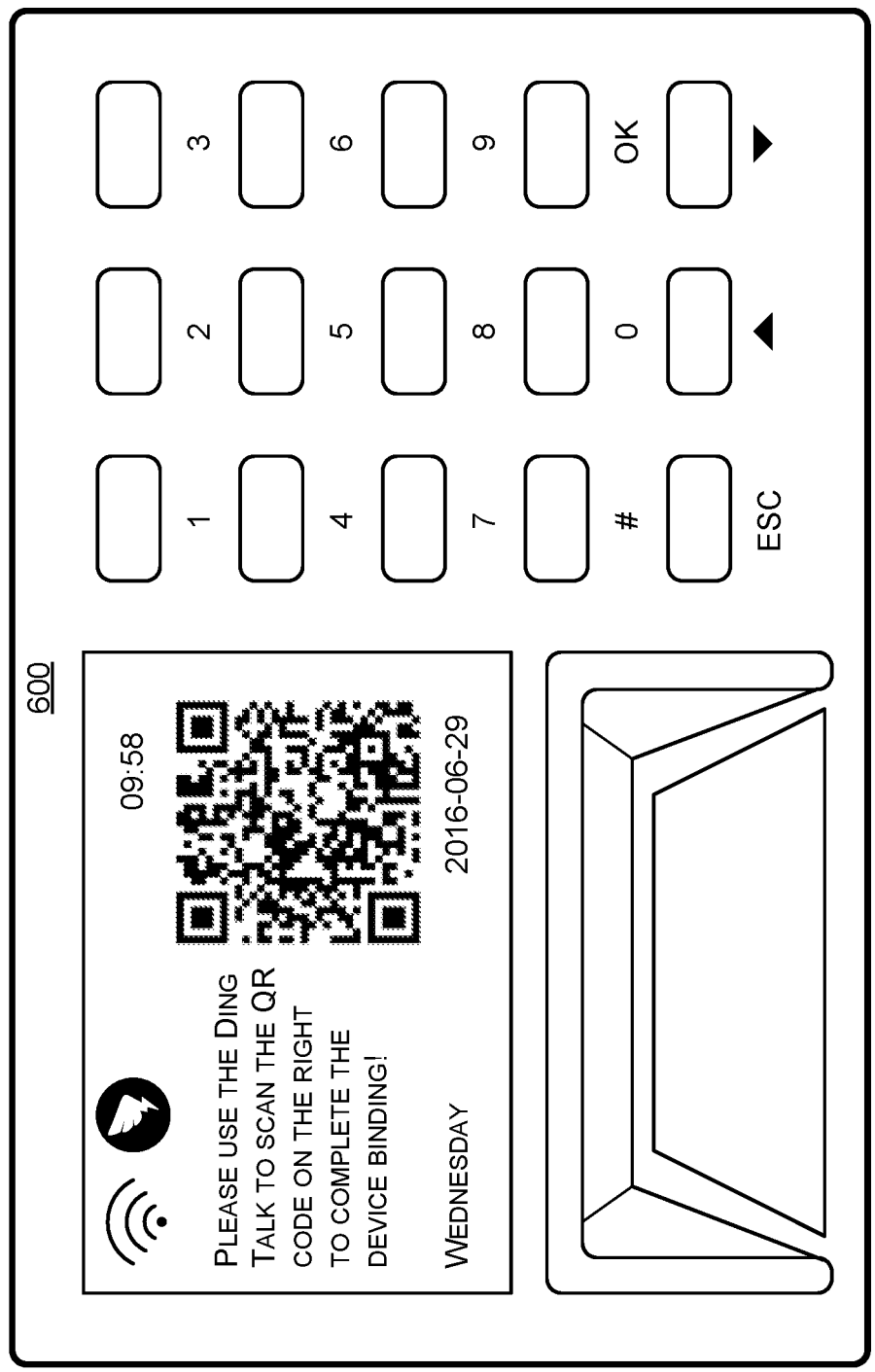
FIG. 6 is a schematic diagram of a smart attendance machine according to an example embodiment of the present application.

In this example embodiment, taking the smart attendance machine 600 shown in FIG. 6 as an example, the activation code may be a two-dimensional code as shown in FIG. 6 or other forms of graphic codes, and the smart attendance machine 600 may directly display the graphic code. Alternatively, the activation code may be a character string or other forms of non-graphical information, and the smart device may directly display the string, or convert the string, and display the converted graphics code as shown in FIG. 6, etc. The activation code may also take other forms, and the smart device may also display the activation code in more ways, which is not limited in this application.

Step 508, the terminal reads the activation code from the smart device.

In this example embodiment, a client terminal that is compatible with an application of the server may be installed on the electronic device. For example, the application may be "DING Talk" or the like. Then, the electronic device may obtain the identification information presented by the smart device, i.e., read the activation code on the smart device through the client terminal, and the corresponding relationship between the identification information and the smart device is already stored on the server.

In an example embodiment, when the activation code on the smart device is in the form of a graphic code, a camera component on the terminal may be started to collect the graphic code through the "code scanning" function on the client terminal. Then, the content of the activation code is read through content recognition. For example, by reading the two-dimensional code shown in FIG. 6, the activation code corresponding to the two-dimensional code may be recognized as "gfd1s5g451f24sg54sg241fd1".

In another embodiment, when the activation code on the smart device is in the form of a character string, the camera component on the terminal may be started to collect the character string through a related function on the client terminal, and then the character string is recognized through, for example, OCR (Optical Character Recognition) and other ways. The client terminal may also show an input box, so that the user may manually input the character string shown on the smart device into the terminal to help the terminal complete the reading operation on the character string.

In addition, in order to guide the user to read the activation code, on the smart attendance machine 600 shown in FIG. 6, text information such as "please scan the two-dimensional code on the right side with DING Talk to complete the device binding" may be displayed to remind the user to perform the corresponding action.

Step 510, the server receives a binding management request sent by the terminal, wherein the binding management request includes an activation code.

Step 512, the server establishes a binding relationship between the community and the smart device.

In this example embodiment, the terminal may send a binding management request including the activation code to the server. After extracting the activation code, the server determines the smart device to which the activation code corresponds according to the corresponding relationship stored in step 506A.

Figure 7:
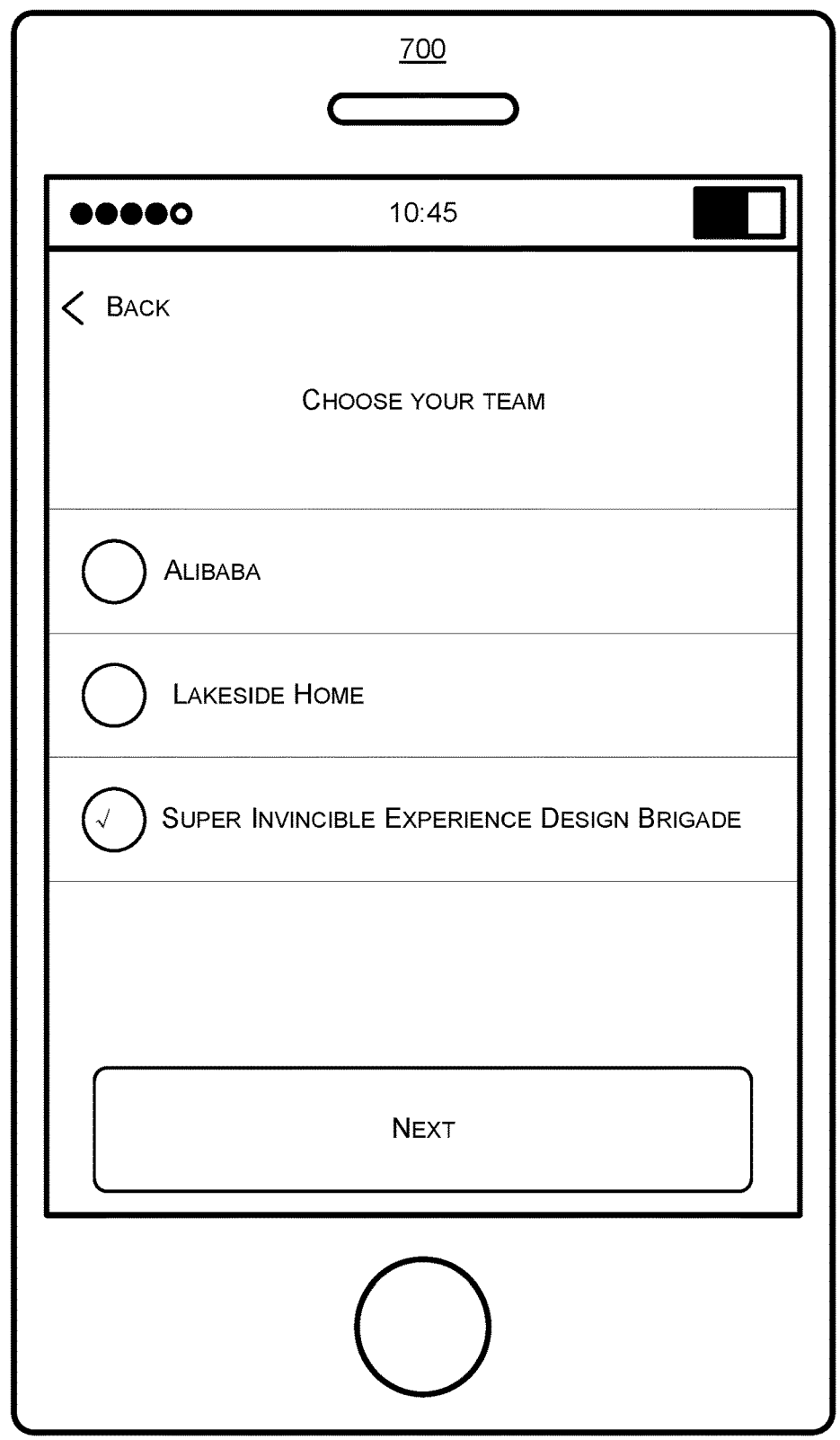
FIG. 7 is a schematic diagram of an interface of centralized management of personnel and equipment based on an instant messaging application according to an example embodiment of the present application.

The "terminal" refers to an electronic device that is registered with a user account, and the user account belongs to a corresponding user, who is affiliated with one or more communities. When the user is affiliated with only one community, the server may directly establish a binding relationship between the community and the smart device. FIG. 7 is a schematic diagram of an interface 700 of centralized management of personnel and equipment based on an instant messaging application according to an example embodiment of the present application. When the user is affiliated with multiple communities, the terminal may display the community selection page shown in FIG. 7. This community selection page contains all the communities with which the user is affiliated, such as "Alibaba", "Lakeside Home", "Super Invincible Experience Design Brigade", etc., such that the user may select and determine one or more communities that the smart device needs to bind. Then, the server establishes a binding relationship between the smart device and the selected community.

Step 514, the server adds the smart device to the organizational architecture.

Step 516, the terminal receives the organizational architecture data pushed by the server.

Step 518, the terminal shows the organizational architecture.

Figure 8:
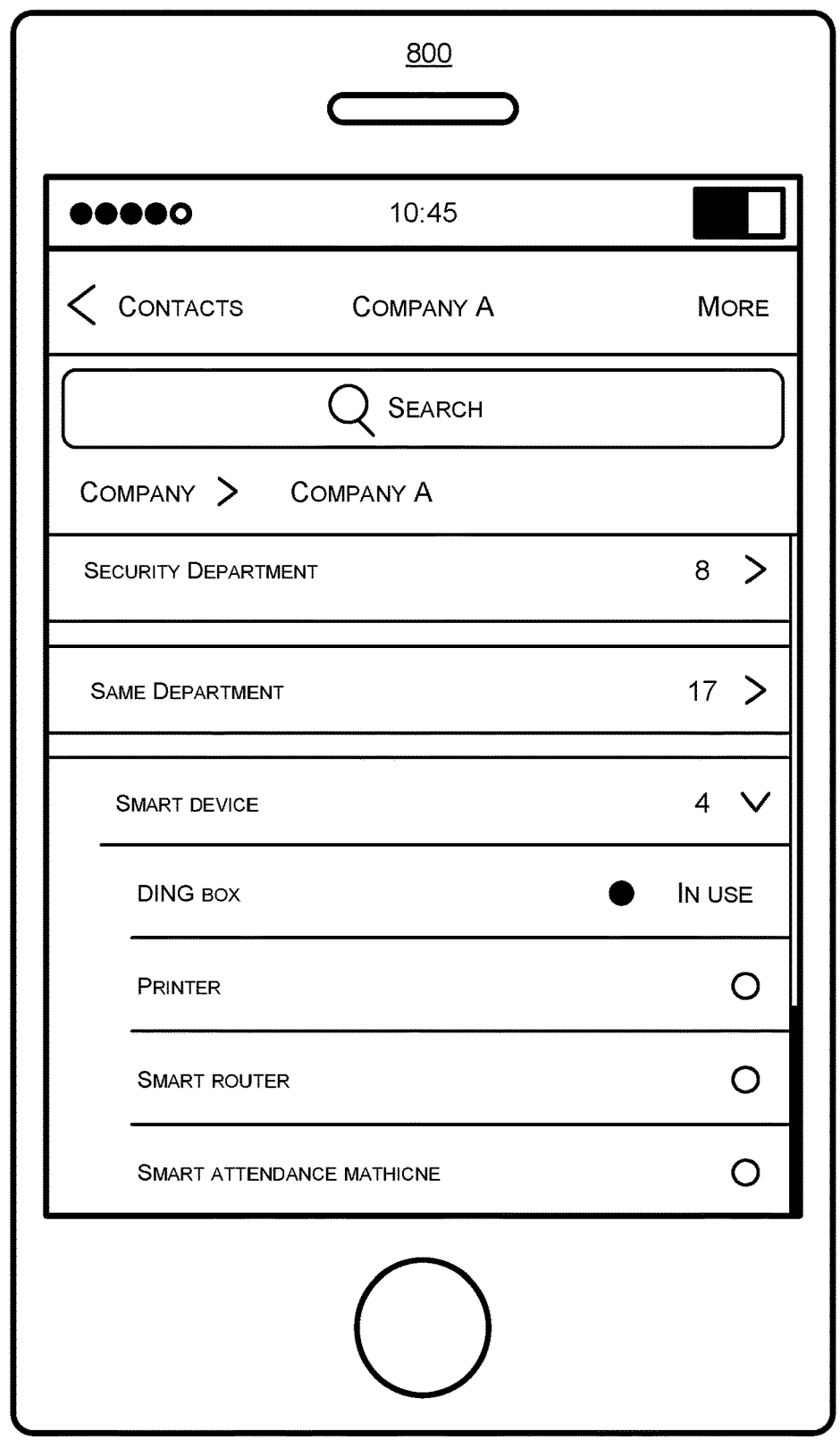
FIG. 8 is a schematic diagram of another interface of centralized management of personnel and equipment based on an instant messaging application according to an example embodiment of the present application.

In this example embodiment, the server adds the equipment management level to the organizational architecture based on the organizational architecture shown in FIG. 2, so that the organizational architecture includes the member management levels shown in FIG. 2 such as "research and development department", "design department", and the like, and the equipment management level added herein at the same time. FIG. 8 is a schematic diagram of another interface 800 of centralized management of personnel and equipment based on an instant messaging application according to an example embodiment of the present application. Accordingly, when the smart device presents the organizational architecture, as shown in FIG. 8, the member management level portals corresponding to the member management levels of "security department", "sales department", and the like, and the equipment management level portal corresponding to the equipment management level of the "smart device" may be respectively shown.

When the terminal detects a triggering operation for the equipment management level portal, for example, when the "smart device" shown in FIG. 8 is triggered, a smart device belonging to the corresponding equipment management level, such as the "DING box", "printer", "smart router", "smart attendance machine", and so on, shown in FIG. 8, may be shown. The organizational architecture may include multiple equipment management levels. For example, according to the type of the smart device, a corresponding equipment management level may be created for each type of smart device, and the corresponding equipment management level portal may be shown respectively in the organizational architecture page.

Figure 9:
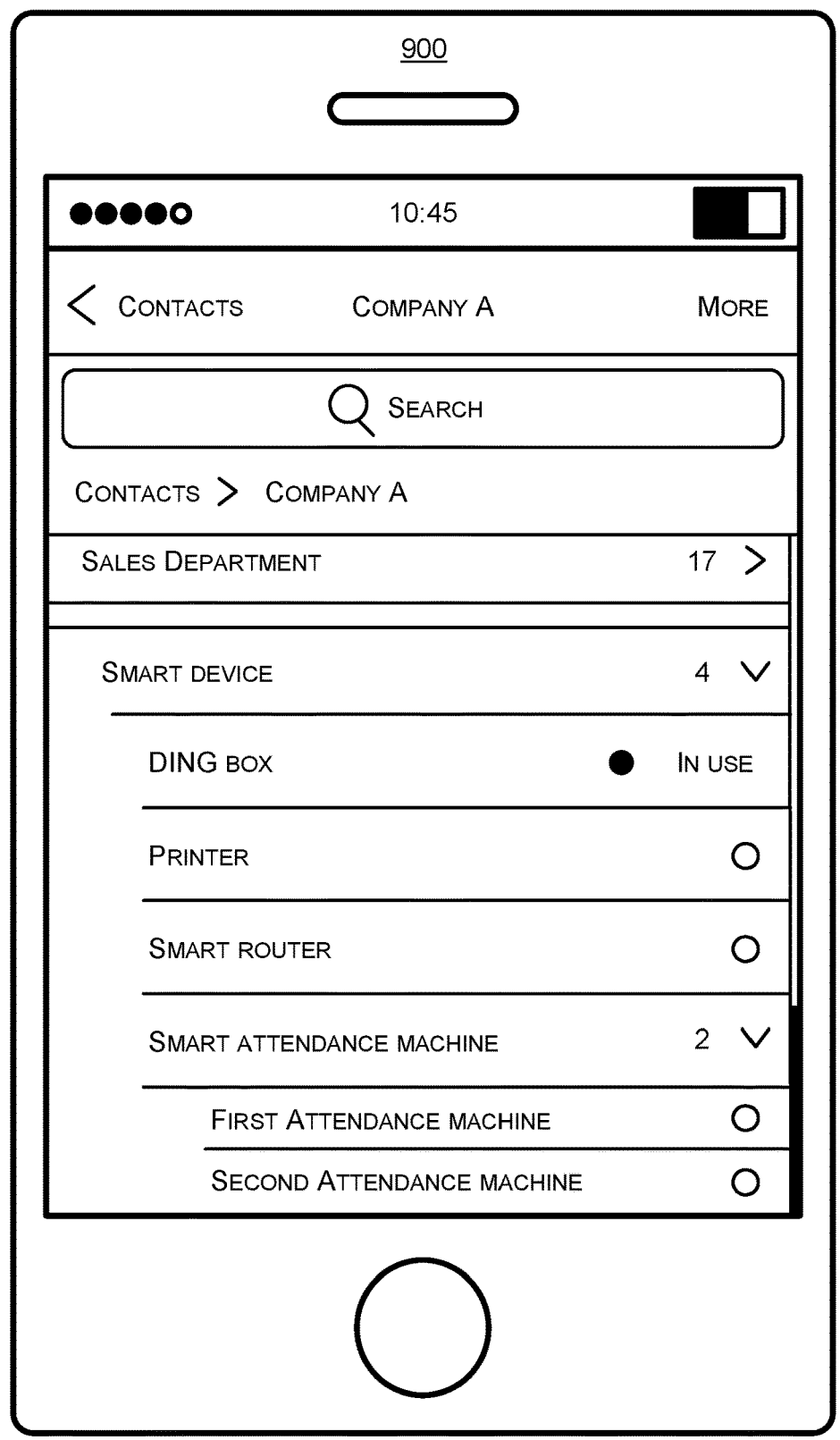
FIG. 9 is a schematic diagram of another interface of centralized management of personnel and equipment based on an instant messaging application according to an example embodiment of the present application.

For each equipment management level, the server may also create several sub-levels. For example, when an equipment management level includes multiple types of smart devices, each sub-level may be created for each type of smart device according to the type of each smart device. FIG. 9 is a schematic diagram of another interface 900 of centralized management of personnel and equipment based on an instant messaging application according to an example embodiment of the present application. For example, as shown in FIG. 9, on the basis of the equipment management level "smart device", multiple sub-levels such as "DING box", "printer", "smart router", "smart attendance machine", and so on may be separately created. In this case, when there are two attendance machines, both of these two attendance machines may be classified into the sub-level "smart attendance machine", and when the sub-level portal corresponding to "smart attendance machine" is triggered, the information of corresponding smart devices, for example, the first attendance machine, the second attendance machine, and the like shown in FIG. 9, may be shown.

Step 520, the server obtains the operating state of the smart device and pushes operating state to the terminal.

Step 522, the terminal shows the operating state of the smart device.

In this example embodiment, the smart device may notify the server of its operating state when the operating state of the smart device changes, so that the server further pushes the operating state to the terminal, and then the terminal indicates the operating state of the corresponding smart device. The server may periodically query the smart device for its operating state, or the information of the operating state may be collected by other methods, which are not limited in this application.

For example, as shown in FIG. 8 and FIG. 9, for a smart device in a standby state, such as "printer", "smart router", or the like, "○" may be used to indicate the operating state thereof; and for a smart device in use, such as "DING box", etc., "●" and "in use" or other words may be used to indicate the corresponding operating state.

Step 524, the terminal sends a control request for the smart device to the server.

Step 526, the server sends a corresponding control instruction to the smart device according to the received control request.

Figure 10:
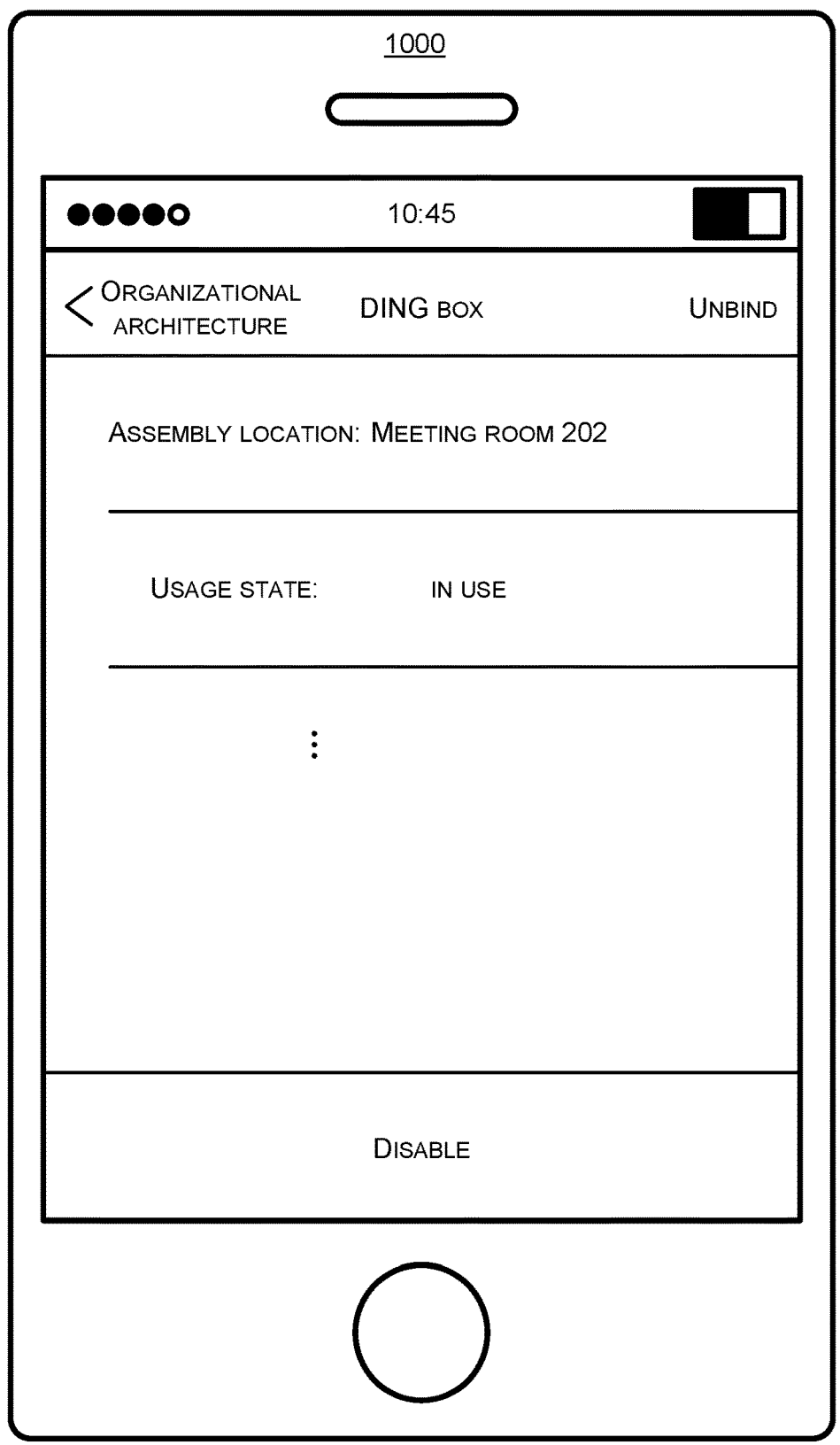
FIG. 10 is a schematic diagram of another interface of a centralized management of personnel and equipment based on an instant messaging application according to an example embodiment of the present application.

In this example embodiment, when it is detected that the information of any smart device is triggered, the terminal may switch from the organizational architecture page to the detail page of the smart device, wherein the detail page includes function buttons for the smart device. For example, when the "DING box" shown in FIG. 8 or FIG. 9 is triggered, the terminal may switch to the detail page shown in FIG. 10, which is a schematic diagram of another interface 1000 of a centralized management of personnel and equipment based on an instant messaging application according to an example embodiment of the present application. FIG. 10 includes information of the smart device "DING box", such as "assembly location" which is "conference room 202", "usage state" which is "in use", etc. At the same time, the detail page also includes function buttons for the "DING box", such as "unbind" in the upper right corner and "disable" at the bottom, and so on.

Then, when any function button is triggered, the terminal may perform a corresponding control function for the smart device. For example, when the "disable" button is triggered, the terminal may initiate a control request for the "DING box" to the server, and the server further sends a control instruction to the "DING box" to perform the "disable" control on "DING box".

Figure 11:
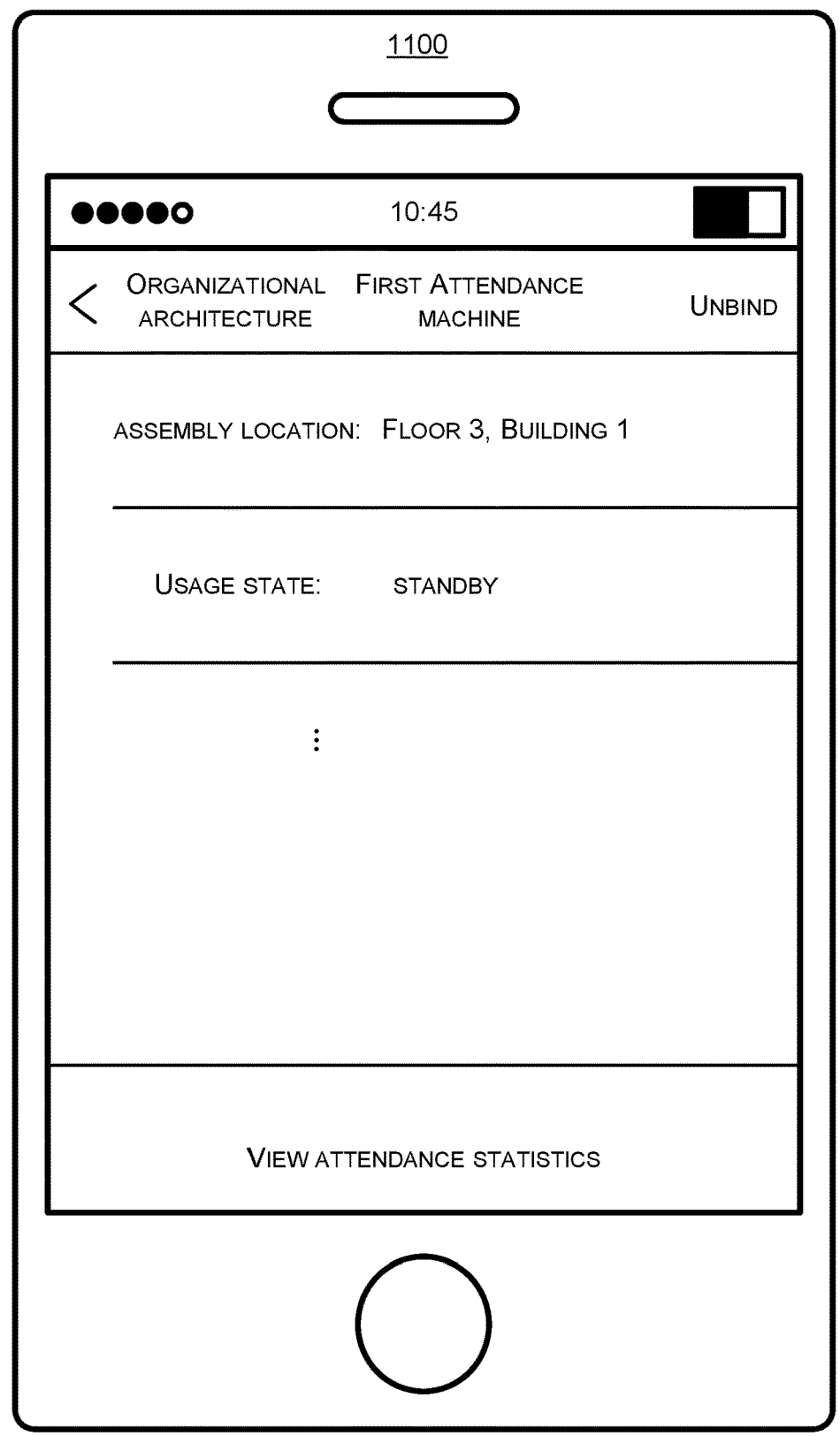
FIG. 11 is a schematic diagram of another interface of a centralized management of personnel and equipment based on an instant messaging application according to an example embodiment of the present application.

For another example, when the "first attendance machine" shown in FIG. 9 is triggered, the first attendance machine may be switched to the detail page shown in FIG. 11, which is a schematic diagram of another interface 1100 of a centralized management of personnel and equipment based on an instant messaging application according to an example embodiment of the present application. The detail page includes information of the smart device "first attendance machine", such as "assembly location" which is "Floor 3, Building 1", "usage state" which is "standby", etc. At the same time, the detail page also includes function buttons for "first attendance machine", such as "unbind" in the upper right corner and "view attendance statistical data" at the bottom, and so on.

In steps 524 to 526, the terminal may also send a control instruction directly to the server, and then the server forwards the control instruction directly to the corresponding smart device without separately generating a control instruction.

In view of the above, in the present application, the binding relationship between the smart device and the community is obtained, and the bound smart device is added to the organizational architecture of the corresponding community, so that the community member can view the information of the related smart device through the organizational architecture, so as to quickly view and operate the smart device that is bound to the community, thereby achieving the efficient management of the smart device within the community.

Figure 12:
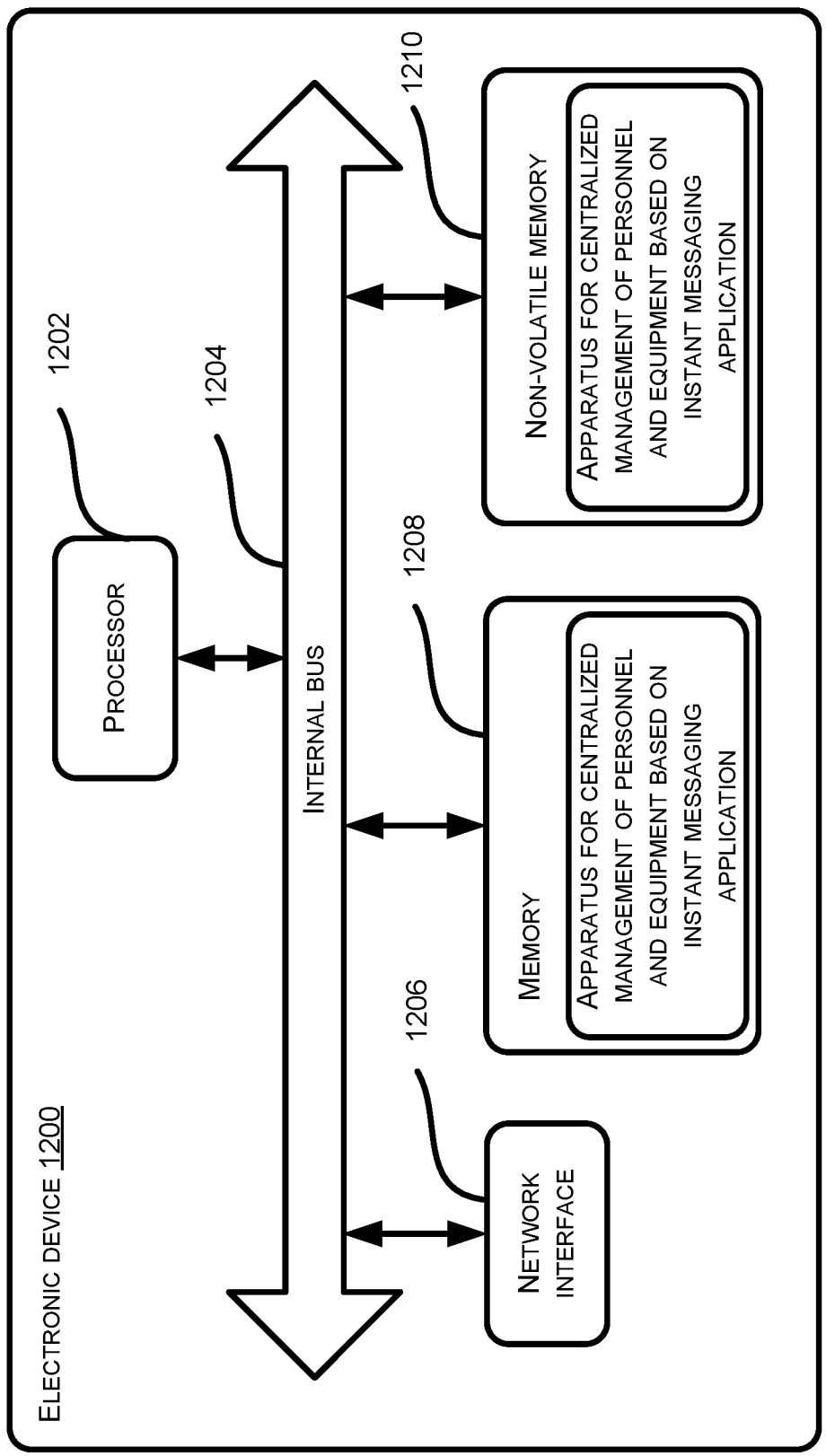
FIG. 12 is a schematic diagram of the structure of an electronic device based on a server side according to an example embodiment of the present application.

FIG. 12 shows a schematic diagram of the structure of an electronic device 1200 according to an example embodiment of the present application. Referring to FIG. 12, at the hardware level, the electronic device 1200 includes a processor 1202, an internal bus 1204, a network interface 1206, a memory 1208, and a non-volatile memory 1210. The electronic device may also include hardware required by other services. The processor 1202 reads the corresponding computer program from the non-volatile memory 1210 into the memory 1202 and then executes it to form an equipment management apparatus at a logical level. In addition to the software implementation, the present application does not exclude other implementations, such as the implementation via a logic device or a combination of software and hardware, etc. That is, the executive body of the following processing flow is not limited to each logical unit but may be a hardware or logic device.

Figure 13:
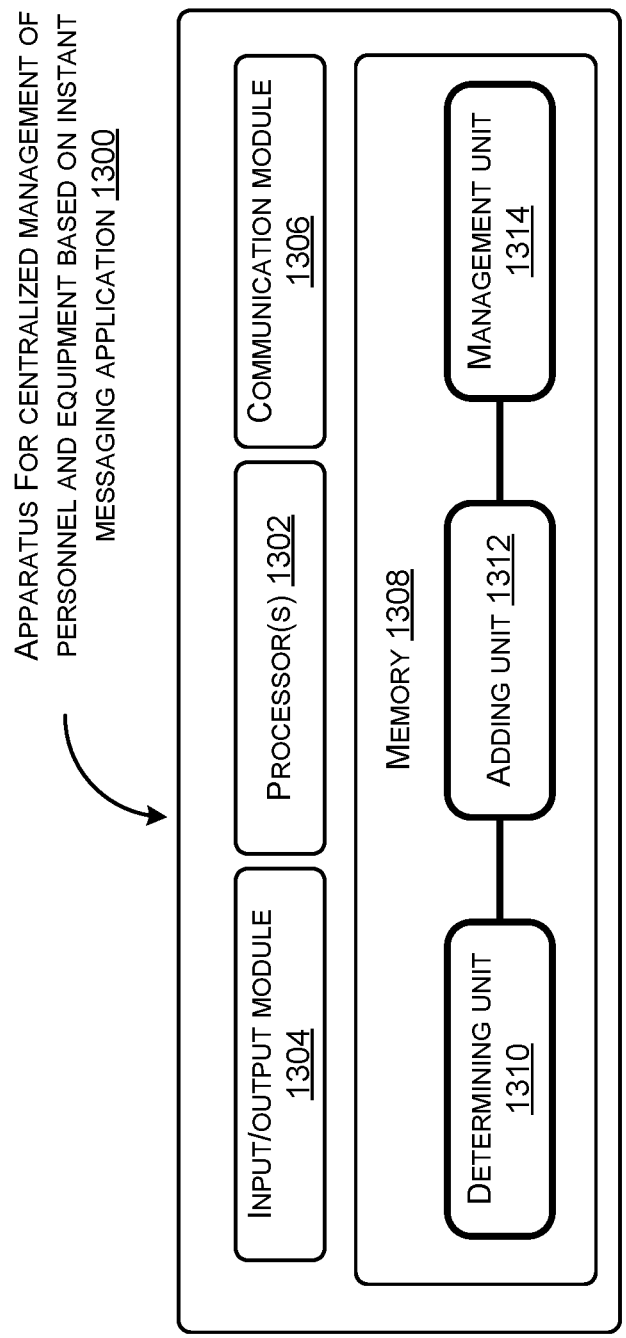
FIG. 13 is a block diagram of an apparatus for centralized management of personnel and equipment based on an instant messaging application based on a server side according to an example embodiment of the present application.

FIG. 13 is a block diagram of an apparatus 1300 for centralized management of personnel and equipment based on an instant messaging application based on a server side according to an example embodiment of the present application. Referring to FIG. 13, in the manner of a software implementation, an equipment management apparatus 1300 may include one or more processors 1302, an input/output module 1304, a communication module 1306, and a memory 1308. The input/output module 1304 is configured to receive data/signal to be processed and to output the processed data/signal. The communication module 1306 is configured to allow the apparatus 1300 to communicate with other devices (not shown) over a network (not shown). The memory 1308 stores thereon computer-executable units executable by the one or more processors 1302. The computer-executable units may include a determining unit 1310 and an adding unit 1312.

The determining unit 1310 is configured to determine a smart device that is bound to a preset community.

The adding unit 1312 is configured to add information of the smart device to an organizational architecture of the preset community so that when a community member of the preset community views an organizational architecture page, the information of the smart device is presented in the organizational architecture page.

In an example embodiment, the adding unit 1312 is configured to add an equipment management level in the organizational architecture and associate the information of the smart device to the equipment management level.

The organizational architecture further includes a plurality of member management levels corresponding to the community member, and the information of the community member of the preset community is associated with the corresponding member management level.

In an example embodiment, the equipment management level includes several sub-levels, and each sub-level corresponds to the same type of smart device.

In an example embodiment, the equipment management apparatus also includes a management unit 1314, wherein when receiving the binding management request of a management user of the preset community for any smart device, the management unit 1314 binds or unbinds the smart device to the preset community.

Figure 14:
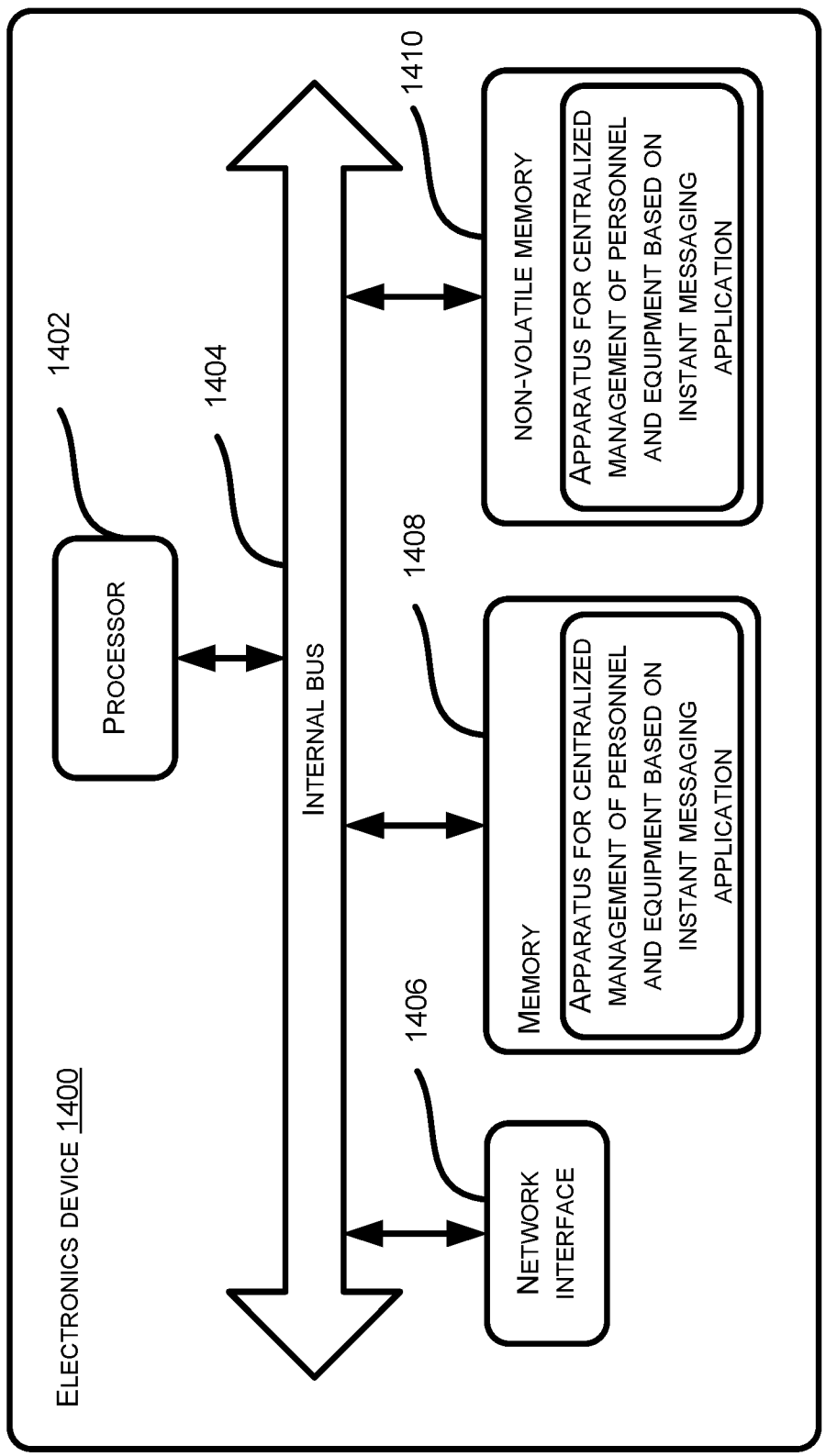
FIG. 14 is a schematic diagram of the structure of an electronic device based on a terminal side according to an example embodiment of the present application.

FIG. 14 shows a schematic diagram of the structure of an electronic device 1400 according to an example embodiment of the present application. Referring to FIG. 14, at the hardware level, the electronic device includes a processor 1402, an internal bus 1404, a network interface 1406, a memory 1408, and a non-volatile memory 1410. The electronic device 1400 may also include hardware required for other services. The processor 1402 reads the corresponding computer program from the non-volatile memory 1410 into the memory 1402 and then executes it to form an equipment management apparatus at a logical level. In addition to the software implementation, the present application does not exclude other implementations, such as the implementation via a logic device or a combination of software and hardware, etc., that is, the executive body of the following processing flow is not limited to each logical unit and may be a hardware or logic device.

Figure 15:
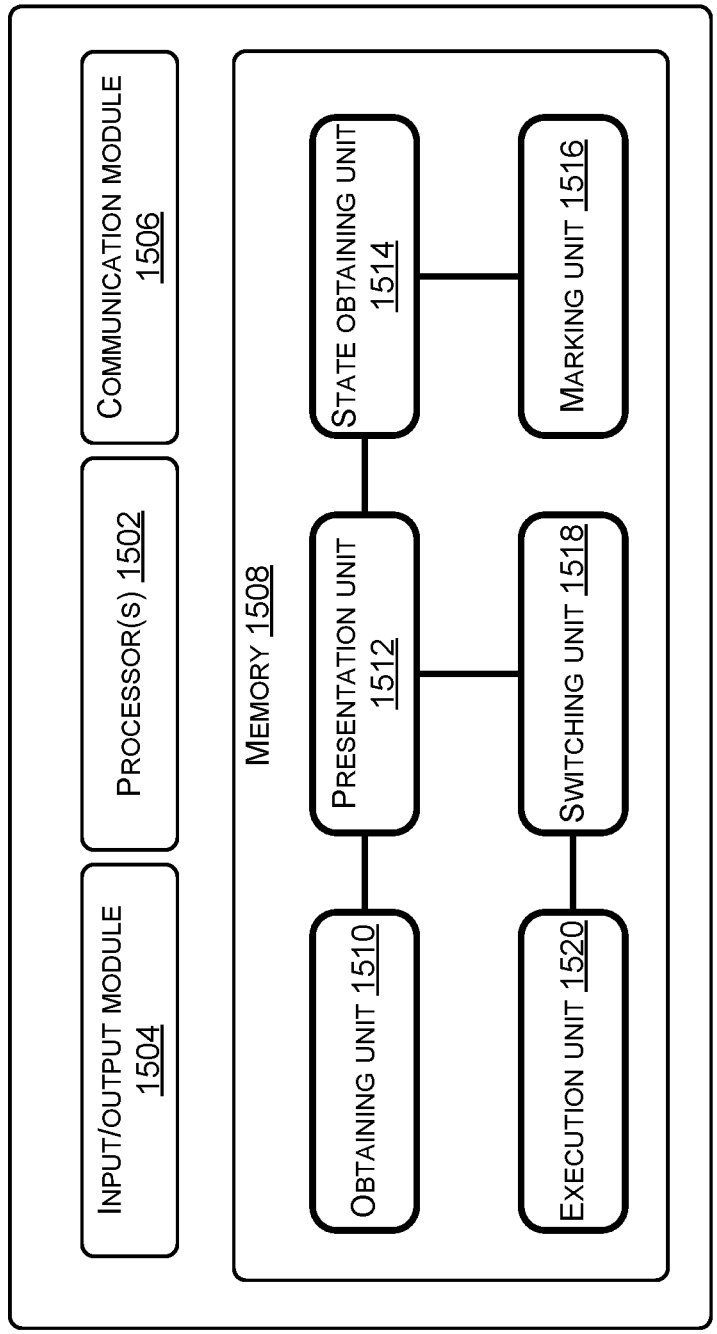
FIG. 15 is a block diagram of an apparatus for centralized management of personnel and equipment based on an instant messaging application based on a terminal side according to an example embodiment of the present application.

Referring to FIG. 15, in the software implementation, the equipment management apparatus 1500 may include one or more processors 1502, an input/output module 1504, a communication module 1506, and a memory 1508. The input/output module 1504 is configured to receive data/signal to be processed and to output the processed data/signal. The communication module 1506 is configured to allow the apparatus 1500 to communicate with other devices (not shown) over a network (not shown). The memory 1508 stores thereon computer-executable units executable by the one or more processors 1502. The computer-executable units may include an obtaining unit 1510, a presentation unit 1512, a state obtaining unit 1514, a marking unit 1516, a switching unit 1518, and an execution unit 1520.

The obtaining unit 1510 is configured to obtain an organizational architecture of a preset community, wherein the organizational architecture corresponds to a community member of the preset community and a smart device associated with the preset community;

The presentation unit 1512 shows an organizational architecture page to present information of a community member or a smart device under the preset community.

In an example embodiment, the community member is classified into a corresponding member management level in the organizational architecture, and the smart device is classified into a corresponding equipment management level in the organizational architecture. The presentation unit 1512 is configured to show an organizational architecture page, wherein the organizational architecture page includes a member management level portal corresponding to the member management level, and an equipment management level portal corresponding to the equipment management level.

When a triggering operation for any member management level portal is detected, the information of the community member under the corresponding member management level is presented. When a triggering operation for any equipment management level portal is detected, the information of the smart device under the corresponding equipment management level is presented.

The state obtaining unit 1514 is configured to obtain an operating state of the smart device.

The marking unit 1516 is configured to indicate an operating state of the smart device in the organizational architecture page.

The switching unit 1518 is configured to, when detecting that the information of any smart device is triggered, the switching unit 1518 realizes the switch to the detail page of the smart devices, wherein the detail page includes function buttons for the smart devices.

The execution unit 1520 is configured to perform a corresponding control function for the smart device when any of the function buttons are triggered.

Figure 16:
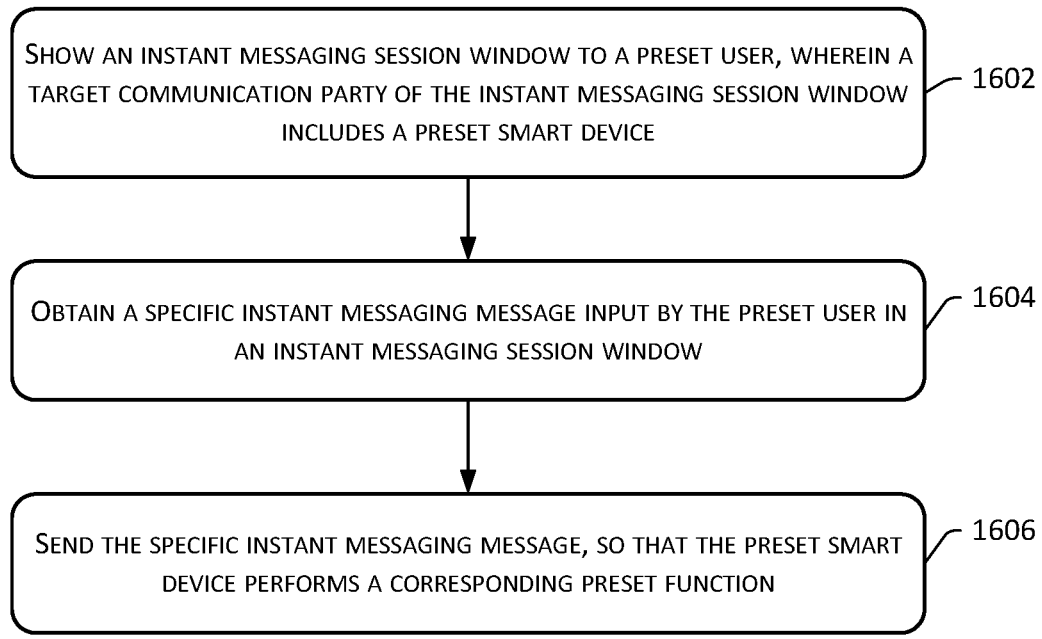
FIG. 16 is a flowchart of another method for centralized management of personnel and equipment based on an instant messaging application based on a terminal side according to an example embodiment of the present application.

FIG. 16 illustrates a flowchart of a method 1600 for centralized management of personnel and equipment based on an instant messaging application according to an example embodiment of the present application. As shown in FIG. 16, the method 1600 is applied to an electronic device and may include the following steps.

Step 1602, an instant messaging session window is shown to a preset user, wherein a target communication party of the instant messaging session window includes a preset smart device.

In this example embodiment, the preset smart device is associated with the preset community to which the preset user belongs and is added to the organizational architecture of the preset community. That is, the preset smart device may be understood as "smart device" in the above embodiments illustrated in FIG. 3 to FIG. 5, such as DING box, printer, smart router, smart attendance machine, etc., shown in FIG. 8.

By associating the smart device with the preset community and adding it to the organizational architecture of the preset community, in combination with the function of the instant messaging application for presenting the organizational architecture, the community members of the preset community (such as the above preset user) may implement fast and convenient management of the smart device on the instant messaging application. The instant messaging application may be an enterprise instant messaging application. For example, the following descriptions may be illustrated by taking a corporate instant messaging application "DING Talk" as an example.

Step 1604, a predetermined instant messaging message input by the preset user in an instant messaging session window is obtained.

Step 1606, the predetermined instant messaging message is sent, so that the preset smart device performs a corresponding preset function.

In this example embodiment, since each smart device may perform many functions, if all functions are presented in a detail page such as shown in FIG. 10 and FIG. 11, by means such as a virtual button, there may be insufficient display space on the electronic device, and the user needs to view and select among a plurality of virtual buttons, which is not conducive to a user operation, resulting in low user operation efficiency and poor user experience. Therefore, in the present application, based on the addition of a smart device to the organizational architecture of a community, the smart device is further "personalized", so that the community member may directly "communicate" with the smart device, deeply integrate the instant messaging function and the equipment management function, eliminate the need for users to manually view and select the desired functions, help simplify user operations, and enhance user operation efficiency and user experience.

Figure 17:
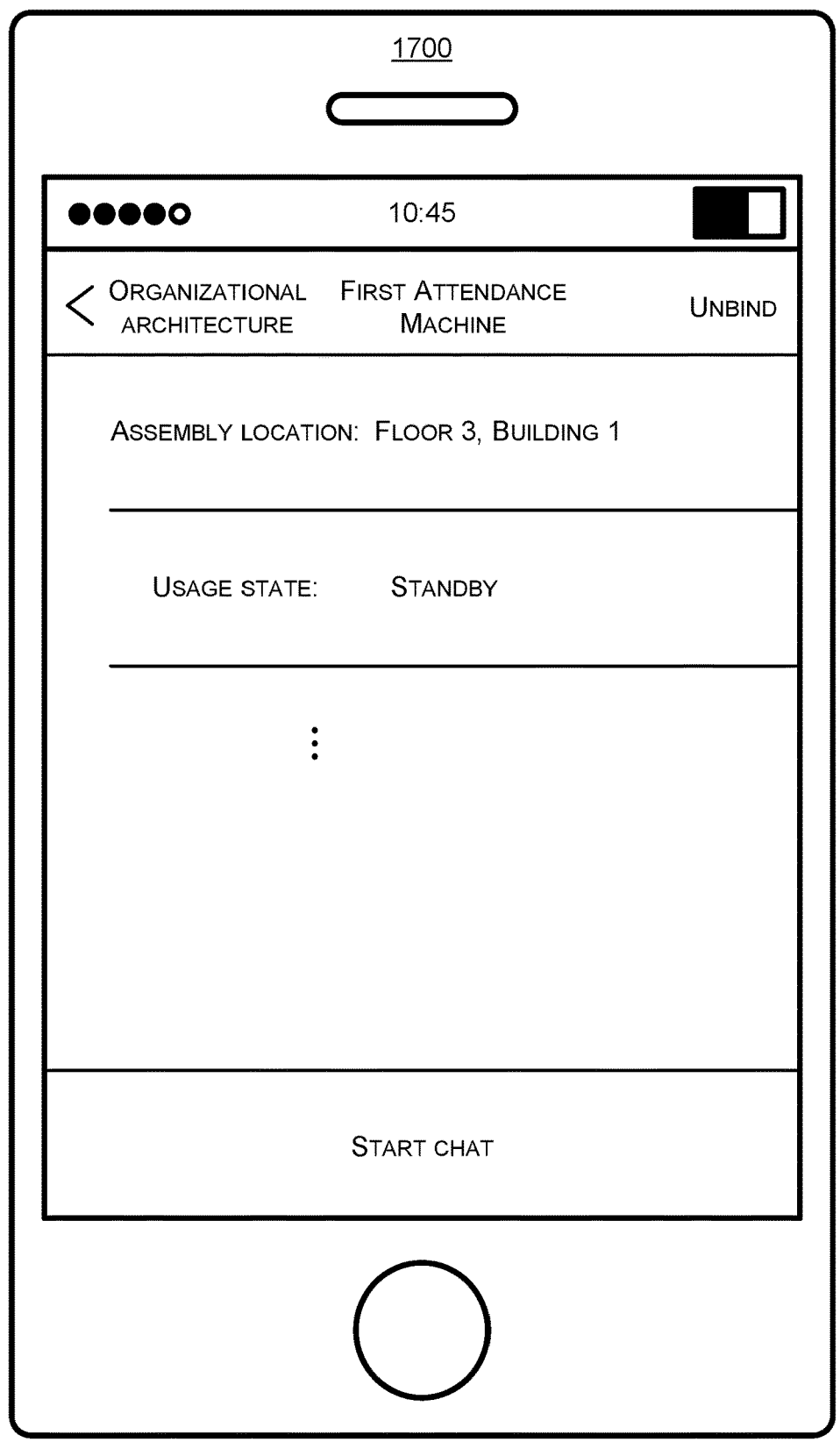
FIG. 17 is a schematic diagram of an interface of centralized management of personnel and equipment based on an instant messaging application according to an example embodiment of the present application.

FIG. 17 is a schematic diagram of an interface 1700 of centralized management of personnel and equipment based on an instant messaging application according to an example embodiment of the present application. Taking the smart device "first attendance machine" as an example, in the detail page shown in FIG. 17, for example, "start chat" portal may be shown, so that after the preset user triggers the portal, the portal switches to the instant messaging session window on the electronic device shown in FIG. 18, which is a schematic diagram of a scenario 1800 of centralized management of personnel and equipment based on an instant messaging application according to an example embodiment of the present application. The preset user is enabled to "communicate" with the first attendance machine 1804 through the instant messaging session window to achieve management of the first attendance machine 1804.

In the case where it is assumed that the instant messaging session window is a single chat window, the preset user may input any message, and the electronic device 1802 may consider the message as a predetermined instant messaging message to achieve control of the corresponding smart device. For example, when the preset user switches from the detail page shown in FIG. 17 to the instant messaging session window shown in FIG. 18, which is a single chat window between the preset user and the first attendance machine 1804, assuming that the preset user wants to view the attendance statistical data of the day, the preset user may directly input "attendance statistical data today", and then the electronic device 1802 may directly consider "attendance statistical data today" as a predetermined instant messaging message to control the first attendance machine 1804 to return the attendance statistical data of the day.

The electronic device 1802 may first send a predetermined instant messaging message to the server 1806, and then the server 1806 obtains a corresponding control instruction after identifying the predetermined instant messaging message and sends the control instruction to the first attendance machine 1804, and then the first attendance machine 1804 may obtain the attendance statistical data of the day by executing the control instruction. The attendance statistical data (as processing data of the preset function of the first attendance machine 1804) may be forwarded to the electronic device 1802 by the server 1806 and expressed as the "conversation" manner shown in FIG. 18 (or any other manner, the present application is not limited to these manners).

In another case where it is assumed that the instant messaging session window is a group chat window, the user needs to add a predetermined identification for the preset smart device in the input content, so that the electronic device may identify it as the predetermined instant messaging message for achieving the control of the corresponding preset smart device. For example, as shown in FIG. 19, when the instant messaging session window is a group chat window of the group "workgroup" and it is assumed that the preset user wants to know the remaining ink amount of the printer, if the preset user directly inputs the "remaining ink amount", the input content will be sent as a normal instant messaging message since there are other users, smart devices, etc. in addition to the printer, and if the preset user input for example "@printer remaining ink amount", the electronic device may determine that it is a predetermined instant messaging message for the printer to control the printer to return the remaining ink amount since there is "@ the printer" which is a predetermined identification for the printer.

Figure 18:
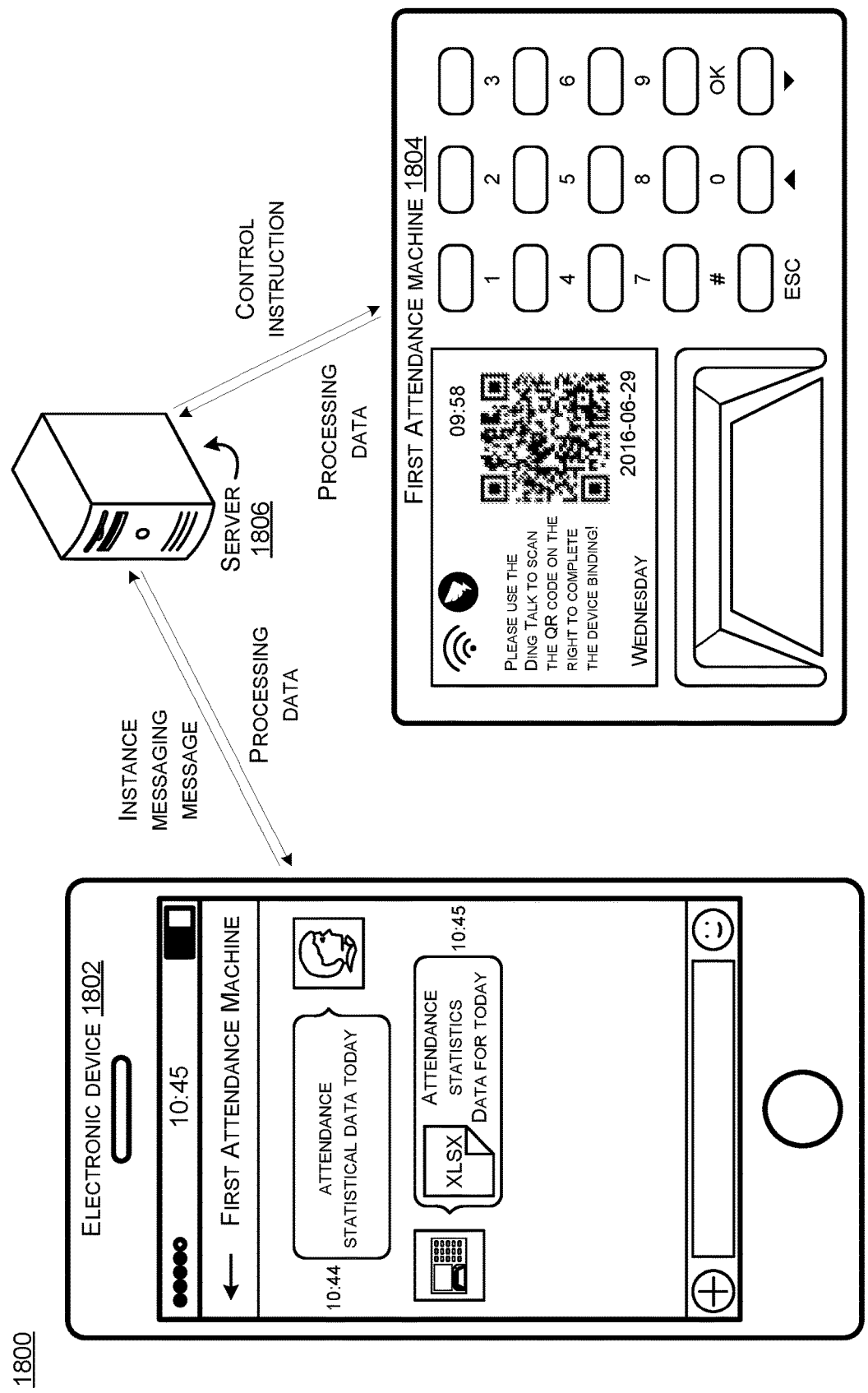
FIG. 18 is a schematic diagram of a scenario of centralized management of personnel and equipment based on an instant messaging application according to an example embodiment of the present application.

In the case of group chat, the processing mode shown in FIG. 18 may still be adopted, that is, the electronic device sends a predetermined instant messaging message to the server for identification, and the server sends the obtained control instruction to the smart device for execution by the smart device and achieves the corresponding functions.

Figure 19:
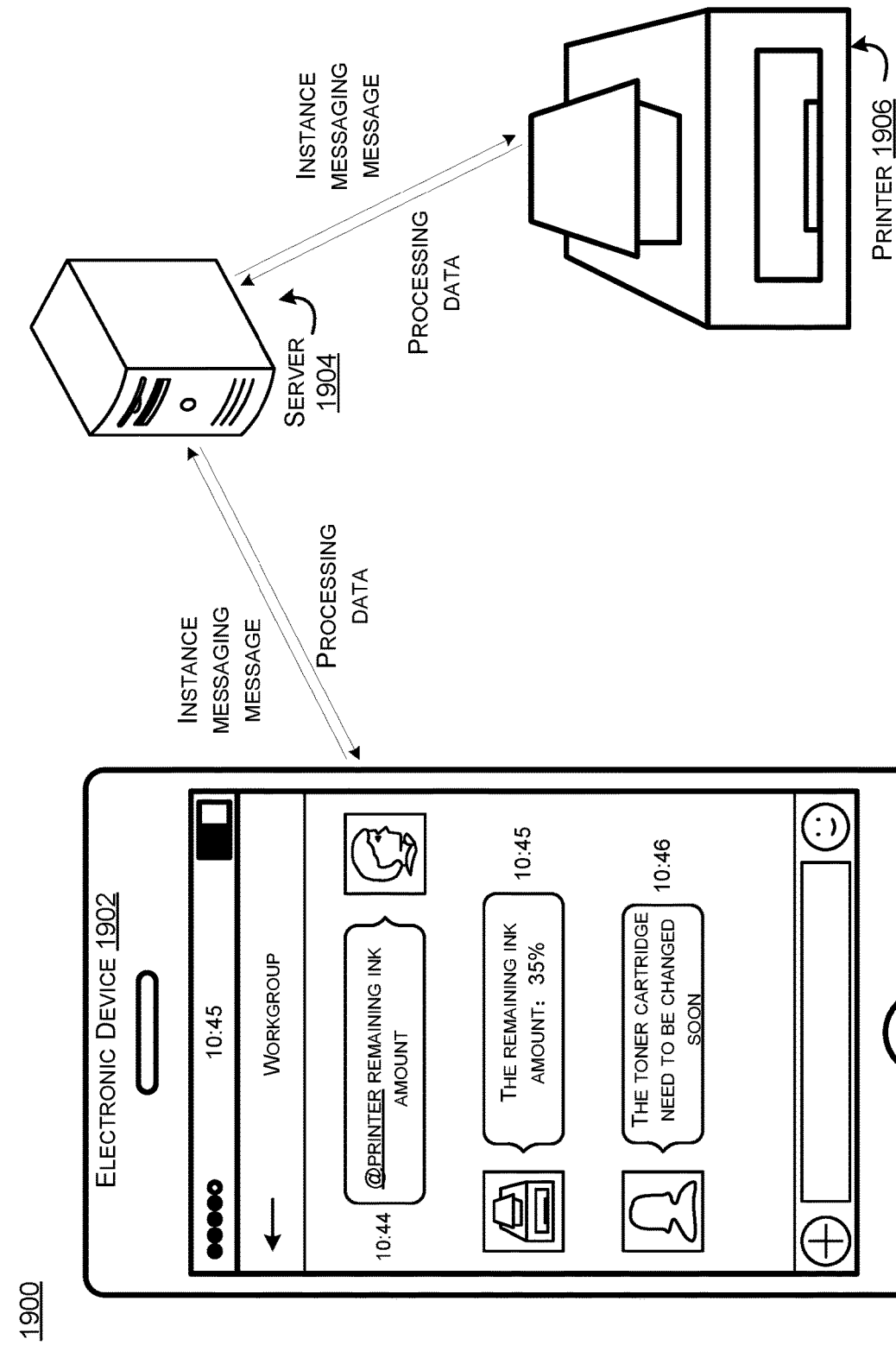
FIG. 19 is a schematic diagram of another scenario of centralized management of personnel and equipment based on an instant messaging application according to an example embodiment of the present application.

Alternatively, in the case of a group chat, the processing mode shown in FIG. 19 may be used. FIG. 19 is a schematic diagram of another scenario 1900 of centralized management of personnel and equipment based on an instant messaging application according to an example embodiment of the present application. Referring to FIG. 19, after the electronic device 1902 sends a predetermined instant messaging message to the server 1904, the server 1904 directly forwards the message to the smart device, such as a printer 1906 and so on, so that the smart device, such as the printer 1906 and so on, may actively identify the predetermined instant messaging message to generate and execute a corresponding control instruction to achieve a corresponding function, for example, notifying the electronic device 1902 through the server 1904 after reading the remaining ink amount per se, so that the electronic device 1902 may use, for example, the "conversation" manner shown in FIG. 19 to present the processed data (i.e., "remaining ink amount: 35%"). The above processing manner shown in FIG. 19 may also be applied to the scenario of a single chat. The present application is not limited to these situations.

Figure 20:
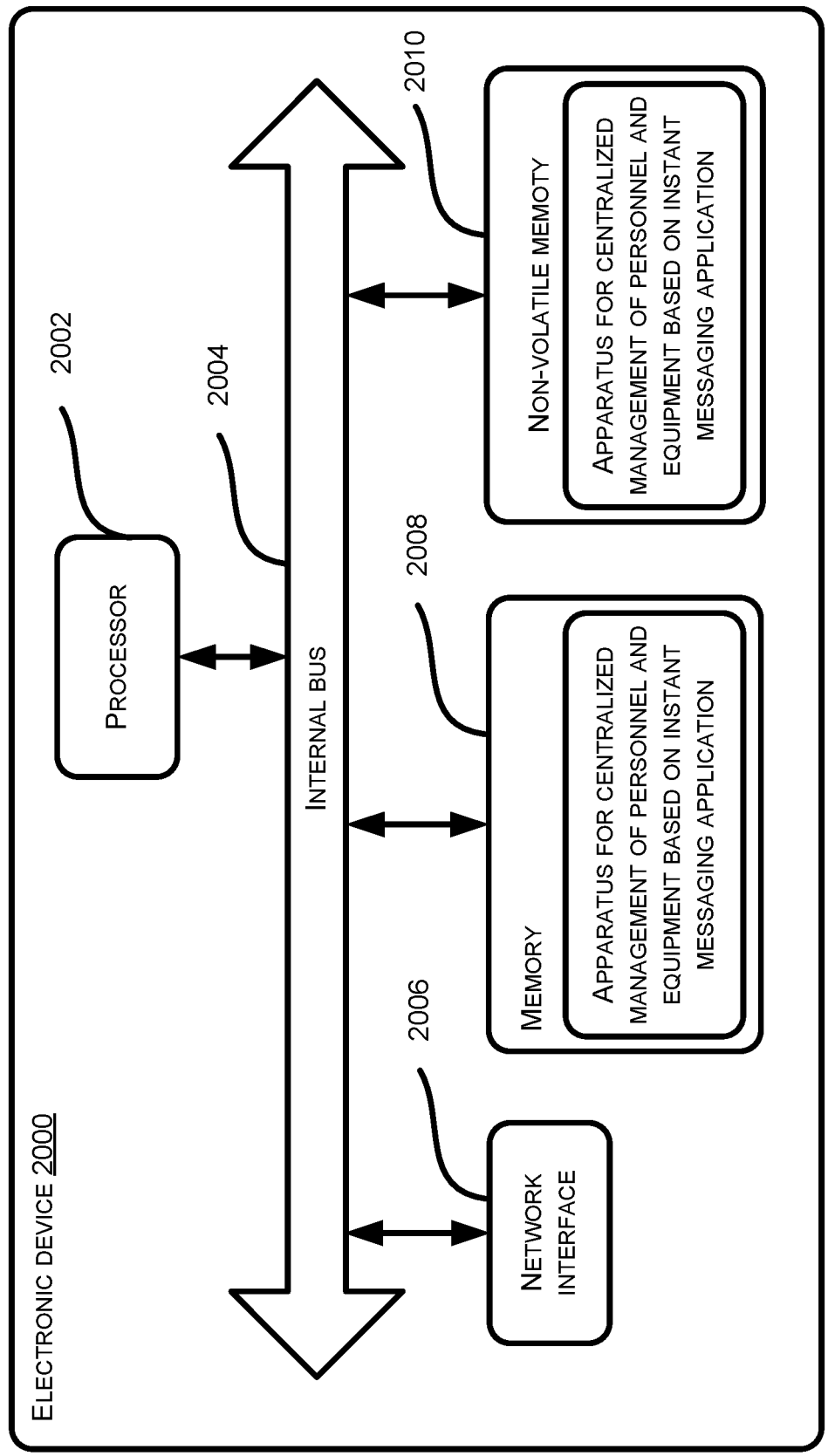
FIG. 20 is a schematic diagram of the structure of another electronic device based on a terminal side according to an example embodiment of the present application.

FIG. 20 shows a schematic diagram of the structure of an electronic device according to an example embodiment of the present application. Referring to FIG. 20, at the hardware level, the electronic device includes a processor 2002, an internal bus 2004, a network interface 2006, a memory 2008, and a non-volatile memory 2010. The electronic device may also include hardware required for other services. The processor 2002 reads the corresponding computer program from the non-volatile memory 2010 into the memory 2002 and then executes it to form an equipment management apparatus on a logical level. In addition to the software implementation, the present application does not exclude other implementations, such as the implementation via a logic device or a combination of software and hardware, etc., that is, the executive body of the following processing flow is not limited to each logical unit and may be a hardware or logic device.

Figure 21:
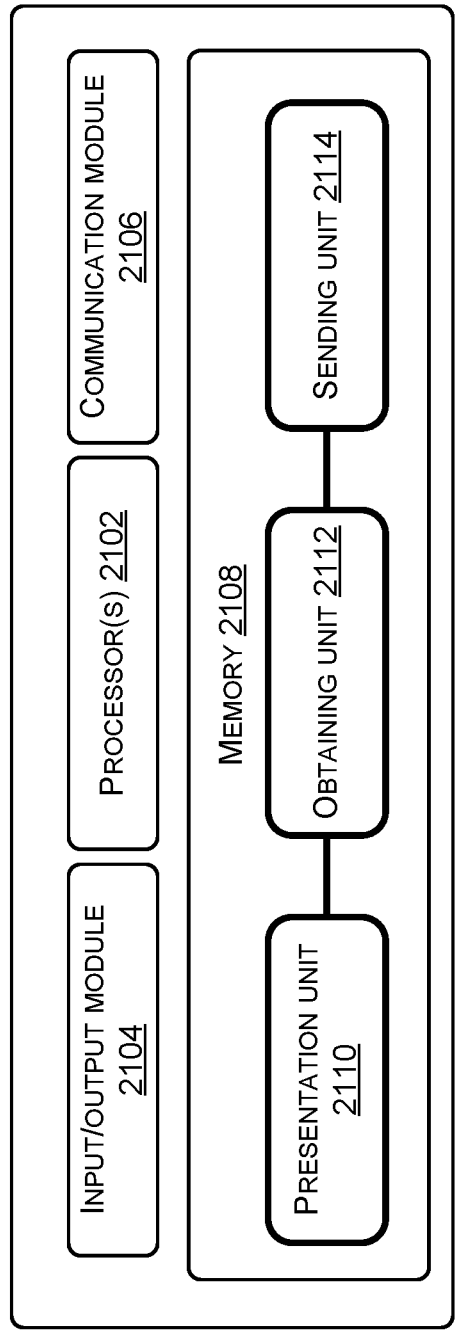
FIG. 21 is a block diagram of another apparatus for centralized management of personnel and equipment based on an instant messaging application based on a terminal side according to an example embodiment of the present application.

FIG. 21 is a block diagram of another apparatus 2100 for centralized management of personnel and equipment based on an instant messaging application based on a terminal side according to an example embodiment of the present application. Referring to FIG. 21, in the software implementation, the equipment management apparatus 2100 may include one or more processors 2102, an input/output module 2104, a communication module 2106, and a memory 2108. The input/output module 2104 is configured to receive data/signal to be processed and to output the processed data/signal. The communication module 2106 is configured to allow the apparatus 2100 to communicate with other devices (not shown) over a network (not shown). The memory 2108 stores thereon computer-executable units executable by the one or more processors 2102. The computer-executable units may include a presentation unit 2110, an obtaining unit 2112, and a sending unit 2114.

The presentation unit 2110 is configured to show an instant messaging session window to the preset user, wherein the target communication party of the instant messaging session window includes a preset smart device, and the preset smart device is associated with the preset community to which the preset user belongs and is added to the organizational architecture of the preset community.

The obtaining unit 2112 is configured to obtain a predetermined instant messaging message input by the preset user in the instant messaging session window.

The sending unit 2114 is configured to send the predetermined instant messaging message to make the preset smart device achieve a corresponding preset function.

In an example embodiment, when the instant messaging session window is a single chat window, the predetermined instant messaging message is any message input by the preset user; when the instant messaging session window is a group chat window, the predetermined instant messaging message includes the predetermined identification input by the preset user for the preset smart device.

In an example embodiment, the sending unit 2114 is configured to transmit the predetermined instant messaging message to the server, so that the server obtains a corresponding control instruction by identifying the predetermined instant messaging message, so as to make the preset smart device achieve the corresponding preset function by receiving and executing the control instruction.

Alternatively, the sending unit 2114 is configured to send the predetermined instant messaging message to the preset smart device, so that the preset smart device obtains a corresponding control instruction by identifying the predetermined instant messaging message and achieves the corresponding preset function by executing the control instruction.

In a typical configuration, a computing device includes one or more processors (CPUs), one or more input/output interfaces, one or more network interfaces, and one or more memories.

The memory may include, among the computer readable media, non-persistent memory, random access memory (RAM), and/or non-volatile memory, such as read-only memory (ROM) or flash memory. Memory is an example of a computer-readable medium.

The computer-readable media, including both permanent and non-persistent, removable and non-removable media, may be stored by any method or technology. The information may be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read-only memory, (ROM), electrically erasable programmable read-only memory (EEPROM), flash memory or other memory technology, compact disk read-only memory (CD-ROM), digital versatile disk (DVD) or other optical storage, magnetic cassette, magnetic tape storage or other magnetic storage devices or any other non-transportable media that may be used to store information that may be accessed by a computing device. As defined herein, computer readable media does not include temporary storage of computer readable transitory media, such as modulated data signals and carrier waves.

It is also to be understood that the terms "comprise", "comprising" or any other variations are intended to cover a non-exclusive inclusion, such that a process, method, item, or device that includes a series of elements includes not only these elements but also other elements not explicitly listed, or elements that are inherent to such process, method, item, or device. Without more restrictions, an element that is defined by the phrase "comprising a . . . " does not exclude the presence of additional identical elements in the process, method, item, or device that comprises the element.

Example embodiments will be described in detail herein, and their examples are illustrated in the accompanying drawings. When the following description involves the accompanying drawings, the same reference number in different figures refers to the same or similar element, unless otherwise indicated. The embodiments described in the following example embodiments do not represent all embodiments consistent with the present application. Instead, they are merely examples of devices and methods consistent with some aspects of the present application as detailed in the appended claims.

The terminology used in the present application is for the purpose of describing particular embodiments only and is not intended to be limiting. The singular forms "a", "said" and "the" used in the present application and the claims are also intended to include their plural forms, unless otherwise indicated. It should also be understood that the term "and/or" as used herein refers to and encompasses any and all possible combinations of one or more of the associated listed items.

It should be understood that, although the terms first, second, third, etc. may be used in this application to describe various information, such information should not be limited to these terms. These terms are only used to distinguish the same type of information from one another. For example, the first information may also be referred to as the second information without departing from the scope of the present application. Similarly, the second information may also be referred to as the first information. Depending on the context, the word "if" as used herein may be interpreted as "when" or "where" or "in response to a determination".

The above descriptions are the example embodiments of the present application and are not intended to limit the present application. Any modifications, equivalent substitutions, improvements, etc., which are made within the spirit and principles of the present application, should fall within the protection scope of the present application.

EXAMPLE CLAUSES

Clause 1. A method for centralized management of personnel and equipment based on an instant messaging application, comprising: determining a smart device that is bound to a preset community; adding information of the smart device to an organizational architecture of the preset community, so that when a community member of the preset community views an organizational architecture page in the instant messaging application, the information of the smart device is presented in the organizational architecture page.

Clause 2. The method according to clause 1, wherein the adding the information of the smart device to the organizational architecture of the preset community comprises: adding an equipment management level in the organizational architecture, and associating the information of the smart device to the equipment management level; wherein the organizational architecture further includes a plurality of member management levels corresponding to the community member, and information of the community member of the preset community is associated with a corresponding member management level.

Clause 3. The method according to clause 2, wherein the equipment management level comprises a plurality of sub-levels, and each sub-level corresponds to the same type of smart device.

Clause 4. The method according to clause 1, further comprising: when a binding management request of a management user of the preset community for any smart device is received, binding or unbinding the smart device with the preset community.

Clause 5. A method for centralized management of personnel and equipment based on an instant messaging application, comprising: obtaining an organizational architecture of a preset community, wherein the organizational architecture corresponds to a community member of the preset community and a smart device associated with the preset community; showing an organizational architecture page in the instant messaging application to present information of the community member or the smart device under the preset community.

Clause 6. The method according to clause 5, wherein the community member is classified into a corresponding member management level in the organizational architecture, and the smart device is classified into a corresponding equipment management level in the organizational architecture; wherein showing the organizational architecture page in the instant messaging application to present the information of the community member or the smart device under the preset community comprises: showing the organizational architecture page, wherein the organizational architecture page includes a member management level portal corresponding to the member management level, and an equipment management level portal corresponding to the equipment management level; presenting the information of the community member under the corresponding member management level when a triggering operation for any member management level portal is detected; presenting the information of the smart device under the corresponding equipment management level when a triggering operation for any equipment management level portal is detected.

Clause 7. The method according to clause 5, further comprising: obtaining an operating state of the smart device; indicating the operating state of the smart device in the organizational architecture page.

Clause 8. The method according to clause 5, further comprising: when it is detected that the information of any smart device is triggered, switching to a detail page of the smart device, wherein the detail page includes a function button for the smart device; when any function key is triggered, performing a corresponding control function for the smart device.

Clause 9. An apparatus for centralized management of personnel and equipment based on an instant messaging application, comprising: a determining unit configured to determine a smart device that is bound to a preset community; an adding unit configured to add information of the smart device to an organizational architecture of the preset community so that when a community member of the preset community views an organizational architecture page in the instant messaging application, the information of the smart device is presented in the organizational architecture page.

Clause 10. The apparatus according to clause 9, wherein the adding unit is configured to: add an equipment management level in the organizational architecture, and associate information of the smart device to the equipment management level; wherein the organizational architecture further includes a plurality of member management levels corresponding to the community members, and the information of the community members of the preset community is associated with a corresponding member management level.

Clause 11. The apparatus according to clause 10, wherein the equipment management level comprises a plurality of sub-levels, and each sub-level corresponds to the same type of smart device.

Clause 12. The apparatus according to clause 9, further comprising: a management unit configured to bind or unbind the smart device with the preset community when receiving a binding management request of a management user of the preset community for any smart device.

Clause 13. An apparatus for centralized management of personnel and equipment based on an instant messaging application, comprising: an obtaining a unit configured to obtain an organizational architecture of a preset community, wherein the organizational architecture corresponds to a community member of the preset community and a smart device associated with the preset community; a presentation unit configured to show an organizational architecture page in the instant messaging application to present information of the community member or the smart device under the preset community.

Clause 14. The apparatus according to clause 13, wherein the community member is classified into a corresponding member management level in the organizational architecture, and the smart device is classified into a corresponding equipment management level in the organizational architecture; wherein the presentation unit is configured to: show the organizational architecture page, wherein the organizational architecture page includes a member management level portal corresponding to the member management level, and an equipment management level portal corresponding to the equipment management level; present the information of the community member under the corresponding member management level when a triggering operation for any member management level portal is detected; present the information of the smart device under the corresponding equipment management level when a triggering operation for any equipment management level portal is detected.

Clause 15. The apparatus according to clause 13, further comprising: a state obtaining unit configured to obtain an operating state of the smart device; an indicating unit configured to indicate the operating state of the smart device in the organizational architecture page.

Clause 16. The apparatus according to clause 13, further comprising: a switching unit configured to switch to a detail page of the smart device when it is detected that the information of any smart device is triggered, wherein the detail page includes a function button for the smart device; a performing unit configured to perform a corresponding control function for the smart devices when any function button is triggered.

Clause 17. A method for centralized management of personnel and equipment based on an instant messaging application, comprising: showing an instant messaging session window to a preset user, wherein a target communication party of the instant messaging session window includes a preset smart device, and the preset smart device is associated with a preset community to which the preset user belongs and is added to an organizational architecture of the preset community; obtaining a predetermined instant messaging message input by the preset user in the instant messaging session window; sending the predetermined instant messaging message to make the preset smart device achieve a corresponding preset function.

Clause 18. The method according to clause 17, wherein: when the instant messaging session window is a single chat window, the predetermined instant messaging message is any message input by the preset user; when the instant messaging session window is a group chat window, the predetermined instant messaging message includes a predetermined identification input by the preset user for the preset smart device.

Clause 19. The method according to clause 17, wherein sending the predetermined instant messaging message comprises: sending the predetermined instant messaging message to a server, so that the server obtains a corresponding control instruction by identifying the predetermined instant messaging message, so as to make the preset smart device achieve a corresponding preset function by receiving and executing the control instruction; or sending the predetermined instant messaging message to the preset smart device, so that the preset smart device obtains a corresponding control instruction by identifying the predetermined instant messaging message and achieves a corresponding preset function by executing the control instruction.

Clause 20. An apparatus for centralized management of personnel and equipment based on an instant messaging application, comprising: a presentation unit configured to show an instant messaging session window to the preset user, wherein a target communication party of the instant messaging session window includes a preset smart device, and the preset smart device is associated with the preset community to which the preset user belongs and is added to an organizational architecture of the preset community; an obtaining unit configured to obtain a predetermined instant messaging message input by the preset user in the instant messaging session window; a sending unit configured to send the predetermined instant messaging message to make the preset smart device achieve a corresponding preset function.

Clause 21. The apparatus according to clause 20, wherein: when the instant messaging session window is a single chat window, the predetermined instant messaging message is any message input by the preset user; when the instant messaging session window is a group chat window, the predetermined instant messaging message includes the predetermined identification input by the preset user for the preset smart device.

Clause 22. The apparatus according to clause 20, wherein the sending unit is configured to: send the predetermined instant messaging message to a server, so that the server obtains a corresponding control instruction by identifying the predetermined instant messaging message, so as to make the preset smart device achieve a corresponding preset function by receiving and executing the control instruction; or send the predetermined instant messaging message to the preset smart device, so that the preset smart device obtains a corresponding control instruction by identifying the predetermined instant messaging message and achieves a corresponding preset function by executing the control instruction.

What is claimed is:

1. A method comprising:
    binding a device with a preset community, the binding including:
        receiving an obtaining request for an activation code from the device;
        assigning the activation code to the device;
        storing a corresponding relationship between the device and the activation code;
        receiving a binding management request from a terminal, the binding management request including the activation code that is obtained by the terminal from the device; and
        binding the preset community with the device;
    determining the device that is bound to the preset community according to the corresponding relationship;
    adding information of the device to an organizational architecture of the preset community; and
    presenting the information of the device in the organizational architecture in response to determining that a community member of the preset community views the organizational architecture in an instant messaging application.

2. The method of claim 1, wherein adding the information of the device to the organizational architecture of the preset community comprises:
    adding an equipment management level in the organizational architecture; and
    associating the information of the device to the equipment management level,
    wherein the organizational architecture includes a plurality of member management levels corresponding to the community member, and information of the community member of the preset community is associated with a corresponding member management level.

3. The method of claim 2, wherein the equipment management level comprises a plurality of sub-levels, and a respective sub-level corresponds to a same type of device.

4. The method of claim 1, further comprising:
unbinding the device with the preset community.

5. The method of claim 1, further comprising:
obtaining the organizational architecture of the preset community, wherein the organizational architecture corresponds to the community member of the preset community and the device associated with the preset community; and
showing the organizational architecture in the instant messaging application to present the information of the community member or the device under the preset community.

6. The method of claim 5, wherein the community member is classified into a corresponding member management level in the organizational architecture, and the device is classified into a corresponding equipment management level in the organizational architecture.

7. The method of claim 5, wherein showing the organizational architecture in the instant messaging application to present the information of the community member or the device under the preset community comprises:
showing the organizational architecture, wherein the organizational architecture includes a member management level portal corresponding to the member management level, and an equipment management level portal corresponding to the equipment management level;
presenting the information of the community member under the corresponding member management level when a first triggering operation for the member management level portal is detected; and
presenting the information of the device under the corresponding equipment management level in response to determining that a second triggering operation for the equipment management level portal is detected.

8. The method of claim 5, further comprising:
obtaining an operating state of the device; and
indicating the operating state of the device in the organizational architecture.

9. The method of claim 5, further comprising:
switching to a detail page of the device in response to determining that the information of the device is detected to be triggered, the detail page including a function button for the device; and
performing a corresponding control function for the device when a function key is triggered.

10. One or more computer-readable media, stored thereon instructions that, when executed by one or more processors, cause the one or more processors to perform acts comprising:
binding a device with a preset community, the binding including:
assigning an activation code to the device, the activation code being a two-dimensional code; and
storing a corresponding relationship between the device and the activation code;
determining the device that is bound to the preset community according to the corresponding relationship;
adding information of the device to an organizational architecture of the preset community;
presenting the information of the device in the organizational architecture in response to determining that a community member of the preset community views an organizational architecture in an instant messaging application; and
presenting the activation code or a varied form of the activation code at a display of the device.

11. The one or more computer-readable media of claim 10, wherein adding the information of the device to the organizational architecture of the preset community comprises:
adding an equipment management level in the organizational architecture; and
associating the information of the device to the equipment management level,
wherein the organizational architecture includes a plurality of member management levels corresponding to the community member, and information of the community member of the preset community is associated with a corresponding member management level.

12. The one or more computer-readable media of claim 11, wherein the equipment management level comprises a plurality of sub-levels, and a respective sub-level corresponds to a same type of device.

13. The one or more computer-readable media of claim 10, further comprising:
unbinding the device with the preset community.

14. The one or more computer-readable media of claim 10, further comprising:
obtaining the organizational architecture of the preset community, wherein the organizational architecture corresponds to the community member of the preset community and the device associated with the preset community; and
showing the organizational architecture in the instant messaging application to present the information of the community member or the device under the preset community.

15. The one or more computer-readable media of claim 14, wherein the community member is classified into the corresponding member management level in the organizational architecture, and the device is classified into a corresponding equipment management level in the organizational architecture.

16. The one or more computer-readable media of claim 14, wherein showing the organizational architecture in the instant messaging application to present the information of the community member or the device under the preset community comprises:
showing the organizational architecture, wherein the organizational architecture includes a member management level portal corresponding to the member management level, and an equipment management level portal corresponding to the equipment management level;
presenting the information of the community member under the corresponding member management level in response to determining that a first triggering operation for the member management level portal is detected; and
presenting the information of the device under the corresponding equipment management level in response to determining that a second triggering operation for the equipment management level portal is detected.

17. The one or more computer-readable media of claim 14, further comprising:
obtaining an operating state of the device; and
indicating the operating state of the device in the organizational architecture.

18. An apparatus comprising:
one or more processors; and
memory stored thereon instructions that, when executed by the one or more processors, cause the one or more processors to perform acts comprising:
  determining a device that is bound to a preset community, the determining including determining an activation code that is assigned to the device;
  adding information of the device to an organizational architecture of the preset community;
  presenting the information of the device in the organizational architecture when a community member of the preset community views an organizational architecture in an instant messaging application; and
  presenting the activation code in a form of a two-dimensional code at a display of the device.

19. The apparatus of claim 18, wherein adding the information of the device to the organizational architecture of the preset community comprises:
  adding an equipment management level in the organizational architecture, and
  associating information of the device to the equipment management level,
  wherein the organizational architecture further includes a plurality of member management levels corresponding to the community members, and the information of the community members of the preset community is associated with a corresponding member management level.

20. The apparatus of claim 18, wherein the acts further comprise:
  binding or unbinding the device with the preset community when receiving a binding management request of a management user of the preset community for the device.

* * * * *